US012101192B2

(12) United States Patent
Yu et al.

(10) Patent No.: US 12,101,192 B2
(45) Date of Patent: Sep. 24, 2024

(54) INFORMATION TRANSMISSION METHOD AND COMMUNICATIONS DEVICE

(71) Applicant: HUAWEI TECHNOLOGIES CO., LTD., Guangdong (CN)

(72) Inventors: Zheng Yu, Beijing (CN); Wenping Bi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 534 days.

(21) Appl. No.: 17/513,513

(22) Filed: Oct. 28, 2021

(65) Prior Publication Data

US 2022/0052797 A1 Feb. 17, 2022

Related U.S. Application Data

(63) Continuation of application No. PCT/CN2019/085165, filed on Apr. 30, 2019.

(51) Int. Cl.
*H04L 1/1812* (2023.01)
*H04L 1/1867* (2023.01)
*H04W 72/23* (2023.01)

(52) U.S. Cl.
CPC .......... *H04L 1/1819* (2013.01); *H04W 72/23* (2023.01); *H04L 1/1887* (2013.01)

(58) Field of Classification Search
CPC ... H04L 1/1887; H04L 1/1822; H04L 1/1896; H04L 1/1819; H04W 72/23
See application file for complete search history.

(56) References Cited

U.S. PATENT DOCUMENTS

2010/0309870 A1 12/2010 Wengerter et al.
2020/0015241 A1* 1/2020 Marinier ............... H04W 72/12
(Continued)

FOREIGN PATENT DOCUMENTS

CN 108631929 A 10/2018
CN 109392152 A 2/2019
(Continued)

OTHER PUBLICATIONS

Extended European Search Report issued in European Application No. 19927382.2 on Mar. 24, 2022, 10 pages.
(Continued)

*Primary Examiner* — Oussama Roudani
(74) *Attorney, Agent, or Firm* — Fish & Richardson P.C.

(57) ABSTRACT

Example transmission methods and apparatus are described. One example method includes receiving control information by a first communications device, where the control information schedules a plurality of transport blocks (TBs), and the control information includes redundancy version (RV) indication information. The first communications device determines a first parameter through pre-specifying, determines the first parameter by receiving physical layer signaling sent by the second communications device, or determines the first parameter by receiving higher layer signaling sent by the second communications device, where the first parameter is a parameter related to a first RV corresponding to a first TB. The first communications device determines the first RV based on the first parameter, and determines, for the first TB based on the first RV and a predetermined RV updating sequence, an RV used in a time unit other than the k time units in the time resource used for transmission of the first TB.

20 Claims, 8 Drawing Sheets

(56) References Cited

U.S. PATENT DOCUMENTS

| | | | | |
|---|---|---|---|---|
| 2020/0106566 A1* | 4/2020 | Yeo | ........................ | H04L 1/1854 |
| 2020/0260391 A1* | 8/2020 | Zhou | ........................ | H04L 1/189 |
| 2021/0266944 A1* | 8/2021 | Noh | ................... | H04W 72/0453 |
| 2022/0116171 A1* | 4/2022 | Zhang | .................... | H04L 5/0094 |

FOREIGN PATENT DOCUMENTS

| | | | |
|---|---|---|---|
| CN | 109600840 A | 4/2019 | |
| EP | 3203671 A1 | 8/2017 | |
| EP | 3923663 A1 | 12/2021 | |

OTHER PUBLICATIONS

Qualcomm Incorporated, "Scheduling of multiple DL/UL transport blocks," 3GPP TSG RAN WG1 Meeting #96, R1-1902376, Athens, Greece, Feb. 25-Mar. 1, 2019, 7 pages.

Qualcomm Incorporated, "Scheduling of multiple DL/UL transport blocks," 3GPP TSG RAN WG1 Meeting #96, R1-1902368, Athens, Greece, Feb. 25-Mar. 1, 2019, 13 pages.

Sierra Wireless, "LTE-M Multiple Transport Block Grant Design Considerations," 3GPP TSG RAN WG1 Meeting #96, R1-1901630, Athens, Greece, Feb. 25-Mar. 3, 2019, 13 pages.

Huawei et al., "Scheduling of multiple transport blocks," 3GPP TSG RAN WG1 Meeting #96bis, R1-1903917, Xi'an, China, Apr. 8-12, 2019, 7 pages.

PCT International Search Report and Written Opinion issued in International Application No. PCT/CN2019/085165 on Jun. 28, 2019, 15 pages (with English translation).

\* cited by examiner

INFORMATION TRANSMISSION METHOD AND COMMUNICATIONS DEVICE

CROSS-REFERENCE TO RELATED APPLICATIONS

This application is a continuation of International Application No. PCT/CN2019/085165, filed on Apr. 30, 2019, the disclosure of which is hereby incorporated by reference in its entirety.

TECHNICAL FIELD

Embodiments of this application relate to the communications field, and in particular, to an information transmission method and a communications device.

BACKGROUND

A base station may send control information, to implement scheduling and transmission of user data. In a communications system, one piece of downlink control information (downlink control information, DCI) is usually used to schedule a transport block (transport block, TB) carried on one data channel. The data channel may be a physical downlink shared channel (physical downlink shared channel, PDSCH) or a physical uplink shared channel (physical uplink shared channel, PUSCH).

Because an enhanced machine type communication (enhanced machine type communication, eMTC) user is located in an area with relatively poor coverage, both control information and data information need to be repeated for a specific quantity of times to reach a specific coverage area. When there is relatively much user data or relatively regular user data, to reduce DCI transmission overheads, one piece of DCI may be used to schedule a plurality of data channels, or one piece of DCI may be used to schedule a plurality of TBs.

In a current data channel transmission process, a redundancy version (redundancy version, RV) of a transport block carried on a data channel needs to be changed. Currently, there is no solution is provided for determining the RV of the transport block.

SUMMARY

Embodiments of this application provide an information transmission method and a communications device, to indicate an RV corresponding to a TB, and reduce overheads of control information.

To resolve the foregoing technical problem, the embodiments of this application provide the following technical solutions:

According to a first aspect, an embodiment of this application provides an information transmission method, including: A first communications device receives control information sent by a second communications device. The control information is used to schedule a plurality of transport blocks TBs, the control information includes redundancy version RV indication information, a quantity of bits occupied by the RV indication information is less than 2M bits, and M is a maximum quantity of TBs that can be scheduled based on the control information. The first communications device determines a first parameter through pre-specifying, determines the first parameter by receiving physical layer signaling sent by the second communications device, or determines the first parameter by receiving higher layer signaling sent by the second communications device. The first parameter is a parameter related to a first RV corresponding to a first TB, the first TB is one of the plurality of TBs scheduled based on the control information, the first RV is an RV used in starting k time units in a time resource used for transmission of the first TB, and k is a positive integer. The first communications device determines the first RV based on the first parameter. The first communications device determines, for the first TB based on the first RV and a predetermined RV updating sequence, an RV used in a time unit other than the k time units in the time resource used for transmission of the first TB.

In this embodiment of this application, the first communications device receives the control information sent by the second communications device. The control information is used to schedule the plurality of transport blocks TBs, the control information includes the redundancy version RV indication information, the quantity of bits occupied by the RV indication information is less than 2M bits, and M is the maximum quantity of TBs that can be scheduled based on the control information. The first communications device determines the first parameter through pre-specifying, determines the first parameter by receiving the physical layer signaling sent by the second communications device, or determines the first parameter by receiving the higher layer signaling sent by the second communications device. The first parameter is the parameter related to the first RV corresponding to the first TB, the first TB is one of the plurality of TBs scheduled based on the control information, and the first RV is the RV used in the starting k time units in the time resource used for transmission of the first TB. The first communications device determines the first RV based on the first parameter. The first communications device determines, for the first TB based on the first RV and the predetermined RV updating sequence, the RV used in the time unit other than the k time units in the time resource used for transmission of the first TB. In this embodiment of this application, the quantity of bits occupied by the RV indication information included in the control information received by the first communications device is less than 2M bits, and the first communications device may determine the first RV based on the first parameter. In this embodiment of this application, an RV corresponding to a TB may be flexibly indicated based on the first parameter. All RVs corresponding to TBs do not need to be indicated by the RV indication information, to reduce overheads of the control information. When decoding performance is ensured and the overheads of the control information are proper, the control information indicates an RV used for transmission of one or more TBs.

In a possible design of the first aspect, that the first communications device determines the first RV based on the first parameter includes: The first communications device performs a modulo operation on the first parameter based on a hybrid automatic repeat request HARQ process number corresponding to the first TB, and uses, as the first RV, a result obtained by performing the modulo operation; or the first communications device performs a modulo operation on the first parameter based on a transport block index corresponding to the first TB, and uses, as the first RV, a result obtained by performing the modulo operation. The first communications device first obtains the HARQ process number corresponding to the first TB. For example, the HARQ process number may be 0 or 1. In this case, the first communications device may perform the modulo operation on the first parameter based on the transport block index corresponding to the first TB. In this case, the obtained result is used as the first RV corresponding to the first TB. For another example, the first communications device first obtains the transport block index corresponding to the first TB. For example, the transport block index may be any value from 0 to 7. In this case, the first communications device may perform the modulo operation on the first parameter based on the transport block index corresponding to the first TB. In this case, the obtained result is used as the first RV corresponding to the first TB. In this embodiment of this application, the first RV corresponding to the first TB may be obtained through the modulo operation, to flexibly indicate an RV corresponding to a TB. All RVs corresponding to TBs do not need to be indicated by the RV indication information, to reduce overheads of the control information. When decoding performance is ensured and the overheads of the control information are proper, the control information indicates a start RV of the one or more TBs.

In a possible design of the first aspect, that the first communications device determines the first RV based on the first parameter includes: The first communications device determines that the first parameter indicates that the RV indication information includes N RV fields, where each RV field indicates one RV, and N is a positive integer; and the first communications device determines that an RV indicated by the $(i+1)^{th}$ RV field in the RV indication information is the first RV, where i is a result obtained by performing a modulo operation on the first parameter based on a HARQ process number corresponding to the first TB, or i is a result obtained by performing a modulo operation on the first parameter based on a transport block index corresponding to the first TB. The first parameter indicates that the RV indication information includes N RV fields, each RV field indicates one RV and N is a positive integer, For example, a value of N may be 4. For example, the first parameter indicates that a quantity of RV fields in the RV indication information is N, or the first parameter indicates whether the RV indication information includes the N RV fields. When the control information includes the N RV fields, the first communications device first performs the modulo operation based on the HARQ process number corresponding to the first TB and the first parameter, to determine i, or performs the modulo operation based on the transport block index corresponding to the first TB and the first parameter, to determine i. Then, the N RV fields included in the RV indication information is queried for the RV indicated by the $(i+1)^{th}$ RV field, and the RV that is indicated by the $(i+1)^{th}$ RV field and that is obtained through query is the first RV. Herein, the N fields may be queried in a cyclic query manner. In this embodiment of this application, the first RV corresponding to the first TB may be obtained through the modulo operation and by searching the N RV fields for the first RV, to flexibly indicate an RV corresponding to a TB. All RVs corresponding to TBs do not need to be indicated by the RV indication information, to reduce overheads of the control information. When decoding performance is ensured and the overheads of the control information are proper, the control information indicates a start RV of the plurality of TBs.

In a possible design of the first aspect, that the first communications device determines the first RV based on the first parameter includes: The first communications device determines bundling that is to be performed on a response feedback of the first TB and a response feedback of a second TB in the plurality of TBs and that is indicated by the first parameter, where the first TB and the second TB have a same RV, and the first communications device determines, based on an RV field included in the RV indication information, the first RV corresponding to the first TB; or the first communications device determines a newly to-be-transmitted TB that is scheduled based on the control information and that is indicated by the first parameter, where newly to-be-transmitted TBs have a same RV, and the first communications device determines, based on an RV field included in the RV indication information, the first RV corresponding to the first TB when the first TB is the newly to-be-transmitted TB; and/or the first communications device determines a to-be-retransmitted TB that is scheduled based on the control information and that is indicated by the first parameter, where to-be-retransmitted TBs have a same RV, and the first communications device determines, based on an RV field included in the RV indication information, the first RV corresponding to the first TB when the first TB is a to-be-retransmitted TB. A response feedback of a TB means that during HARQ transmission, a response to data carried on the TB is an ACK or a NACK. For example, response feedback information of different TBs is bundled (bundling). For example, the response feedback of the first TB and the response feedback of the second TB are bundled. The first parameter may indicate to bundle the response feedback of the first TB and the response feedback of the second TB in the plurality of TBs. The DCI may indicate the first RV corresponding to the first TB. In this embodiment of this application, the first RV corresponding to the first TB may be obtained through bundling of response feedbacks, to flexibly indicate an RV corresponding to a TB. All RVs corresponding to TBs do not wed to be indicated by the RV indication information, to reduce overheads of the control information. When decoding performance is ensured and the overheads of the control information are proper, the control information indicates a start RV of the plurality of TBs.

In a possible design of the first aspect, that the first communications device determines the first RV based on the first parameter includes: The first communications device determines an RV set indicated by the first parameter, and the first communications device determines that an RV that is in the RV set and that is indicated by an RV field included in the RV indication information is the first RV; or the first communications device determines an RV offset value indicated by the first parameter, and the first communications device performs offset based on the RV offset value and an RV indicated by an RV field included in the RV indication information, where a result obtained after offset is the first RV The first parameter may be used to indicate an RV set, and an RV that is in the RV set and that is indicated by the RV field included in the RV indication information in the control information is the first RV. Therefore, in this embodiment of this application, the first RV corresponding to the first TB may be obtained based on the RV set indicated by the first parameter, to flexibly indicate an RV corresponding to a TB. All RVs corresponding to TBs do not need to be indicated by the RV indication information, to reduce overheads of the control information. When decoding performance is ensured and the overheads of the control information are proper, the control information indicates a start RV of the plurality of TBs. In addition, in this embodiment of this application, the first RV corresponding to the first TB may be Obtained based on the RV offset value indicated by the first parameter, to flexibly indicate an RV corresponding to a TB. All RVs corresponding to TBs do not need to be indicated by the RV indication information, to reduce overheads of the control information. When decoding performance is ensured and the overheads of the control information are proper, the control information indicates a start RV of the plurality of TBs.

In a possible design of the first aspect, that the first communications device determines the first RV based on the first parameter includes: The first communications device determines a quantity of RV fields or a quantity of RV values that corresponds to a repetition quantity and that is indicated by the first parameter; and the first communications device determines a bit state of a first field that is included in the control information, and determines the first RV according to a one-to-one correspondence between a bit state of the first field and three parameters, where the three parameters include the repetition quantity, whether to enable frequency hopping, and the first RV; or the first communications device determines a bit state of a first field that is included in the control information, and determines the first RV according to a one-to-one correspondence between a bit state of the first field and four parameters, where the four parameters include a quantity of TBs scheduled based on the control information, the repetition quantity, whether to enable frequency hopping, and the first RV.

In a possible design of the first aspect, the control information indicates the repetition quantity, and the repetition quantity is a repetition quantity of the control information or a repetition quantity of a data channel for transmitting a TB; and the method further includes: When the repetition quantity belongs to a first repetition quantity set, the first communications device determines, based on received higher layer signaling sent by the second communications device, to enable or disable frequency hopping, and when the repetition quantity belongs to a second repetition quantity set, the first communications device determines, based on the control information, to enable or disable frequency hopping; or when the repetition quantity belongs to a first repetition quantity set, the first communications device determines not to enable frequency hopping, and when the repetition quantity belongs to a second repetition quantity set, the first communications device determines, based on the control information, to enable or disable frequency hopping.

In a possible design of the first aspect, the control information indicates the repetition quantity, and the repetition quantity is a repetition quantity of the control information or a repetition quantity of a data channel for transmitting a TB; and the method further includes: When the repetition quantity belongs to a first repetition quantity set, the first communications device determines that the RV indication information indicates the first RV in S RV fields or S RV values, and when the repetition quantity belongs to a second repetition quantity set, the first communications device determines that the control information indicates the first RV in T RV fields or T RV values, where T is less than S, a quantity of repetition quantities included in the second repetition quantity set is greater than a quantity of repetition quantities included in the first repetition quantity set, and T and S each are a positive integer; or when the repetition quantity belongs to a first repetition quantity set, the first communications device determines that the control information indicates the first RV in S RV fields and/or S RV values, and when the repetition quantity belongs to a second repetition quantity set, the first communications device determines that the first RV is a specific RV.

In a possible design of the first aspect, that the first communications device determines, for the first TB based on the first RV and a predetermined RV updating sequence, an RV used in a time unit other than the k time units in the time resource used for transmission of the first TB includes: The first communications device changes, at intervals of time units whose quantity is a second parameter and based on the first RV corresponding to the first TB and the predetermined RV updating sequence, the RV used for the first TB in the time unit other than the k time units in the time resource used for transmission of the first TB.

According to a second aspect, an embodiment of this application further provides an information transmission method, including: A second communications device sends control information to a first communications device. The control information is used to schedule a plurality of transport blocks TBs, the control information includes redundancy version RV indication information, a quantity of bits occupied by the RV indication information is less than 2M bits, and M is a maximum quantity of TBs that can be scheduled based on the control information. The second communications device determines a first RV of a first TB and a first parameter, where the first TB is one of the plurality of TBs scheduled based on the control information, the first RV is an RV used in starting k time units in a time resource used for transmission of the first TB, k is a positive integer, and the first parameter is a parameter related to the first RV. The second communications device sends physical layer signaling to the first communications device, or sends higher layer signaling to the first communications device. The physical layer signaling or the higher layer signaling carries the first parameter. The second communications device determines, for the first TB based on the first RV and a predetermined RV updating sequence, an RV used in a time unit other than the k time units in the time resource used for transmission of the first TB.

In a possible design of the second aspect, that the second communications device determines a first RV of a first TB and a first parameter includes: The second communications device determines the first parameter and a hybrid automatic repeat request HARQ process number corresponding to the first TB, and determines the first RV based on an association relationship between the hybrid automatic repeat request HARQ process number corresponding to the first TB and the first parameter; or the second communications device determines the first parameter and a transport block index corresponding to the first TB, and determines the first RV based on an association relationship between the transport block index corresponding to the first TB and the first parameter.

In a possible design of the second aspect, that the second communications device determines a first RV of a first TB and a first parameter includes: The second communications device determines that an RV indicated by the $(i+1)^{th}$ RV field in the RV indication information is the first RV, where i is a result obtained by performing a modulo operation on the first parameter based on a HARQ process number corresponding to the first TB, or i is a result obtained by performing a modulo operation on the first parameter based on a transport block index corresponding to the first TB; and the second communications device sets that the first parameter indicates that the RV indication information includes N RV fields, where each RV field indicates one RV, and N is a positive integer.

In a possible design of the second aspect, that the second communications device determines a first RV of a first TB and a first parameter includes: The second communications device sets that the first parameter indicates to bundle a response feedback of the first TB and a response feedback of a second. TB in the plurality of TBs, where the first TB and the second TB have a same RV and an RV field included in the RV indication information in the control information sent by the second communications device indicates the first RV corresponding to the first TB; and/or the second communications device determines the first RV corresponding to the first TB when the first TB is the newly to-be-transmitted TB, setting, by the second communications device, that the first parameter indicates a newly to-be-transmitted TB scheduled based on the control information, where newly to-be-transmitted TBs have a same RV, and the second communications device uses an RV field included in the RV indication information to indicate the first RV; and/or the second communications device determines the first RV corresponding to the first TB when the first TB is a to-be-retransmitted TB, the second communications device sets a to-be-retransmitted TB that is scheduled based on the control information and that is indicated by the first parameter, where to-be-retransmitted TBs have a same RV and the second communications device uses an RV field included in the RV indication information to indicate the first RV.

In a possible design of the second aspect, that the second communications device determines a first RV of a first TB and a first parameter includes: The second communications device determines that an RV that is in an RV set and that is indicated by an RV field included in the RV indication information is the first RV, and the second communications device sets an RV set indicated by the first parameter; or the second communications device determines an RV indicated by an RV field included in the RV indication information, the second communications device determines the first RV that corresponds to the first TB and that is configured for the first communications device, the second communications device determines an RV offset value used when offset is performed based on the RV indicated by the RV field included in the RV indication information, to obtain the first and the second communications device sets the RV offset value indicated by the first parameter.

In a possible design of the second aspect, that the second communications device determines a first RV of a first TB and a first parameter includes: The second communications device sets a quantity of RV fields or a quantity of RV values that corresponds to a repetition quantity and that is indicated by the first parameter; and the second communications device determines the first RV that corresponds to the first TB and that is configured for the first communications device, the second communications device determines a bit state of a first field according to a one-to-one correspondence between a bit state of the first field and three parameters, and the second communications device sets the bit state of the first field that is included in the control information, where the three parameters include the repetition quantity, whether to enable frequency hopping, and the first RV; or the second communications device determines the first RV that corresponds to the first TB and that is configured for the first communications device, the second communications device determines a bit state of a first field according to a one-to-one correspondence between a bit state of the first field and four parameters, and the second communications device sets the bit state of a first field that is included in the control information, where the four parameters include a quantity of TBs scheduled based on the control information, the repetition quantity, whether to enable frequency hopping, and the first RV.

In a possible design of the second aspect, the control information indicates the repetition quantity, and the repetition quantity is a repetition quantity of the control information or a repetition quantity of a data channel for transmitting a TB; and the method further includes: When the repetition quantity belongs to a first repetition quantity set, the second communications device configures, based on a case of enabling or disabling frequency hopping, the higher layer signaling sent by the second communications device, and when the repetition quantity belongs to a second repetition quantity set, the second communications device configures the control information based on the case of enabling or disabling frequency hopping; or when the repetition quantity belongs to a first repetition quantity set, the second communications device determines not to enable frequency hopping, and when the repetition quantity belongs to a second repetition quantity set, the second communications device configures the control information based on the case of enabling or disabling frequency hopping.

In a possible design of the second aspect, the control information indicates the repetition quantity, and the repetition quantity is a repetition quantity of the control information or a repetition quantity of a data channel for transmitting a TB; and the method further includes: When the repetition quantity belongs to a first repetition quantity set, the second communications device determines that the RV indication information indicates the first RV in S RV fields or S RV values, and when the repetition quantity belongs to a second repetition quantity set, the second communications device determines that the control information indicates the first RV in T RV fields or T RV values, where T is less than S, a quantity of repetition quantities included in the second repetition quantity set is greater than a quantity of repetition quantities included in the first repetition quantity set, and T and S each are a positive integer; or when the repetition quantity belongs to a first repetition quantity set, the second communications device determines that the control information indicates the first RV in S RV fields or S RV values, and when the repetition quantity belongs to a second repetition quantity set, the second communications device determines that the first RV is a specific RV.

In a possible design of the second aspect, that the second communications device determines, for the first TB based on the first RV and a predetermined RV updating sequence, an RV used in a tune unit other than the k time units in the time resource used for transmission of the first TB includes: The second communications device changes, at intervals of time units whose quantity is a second parameter and based on the first RV corresponding to the first TB and the predetermined RV updating sequence, the RV used for the first TB in the time unit other than the k time units in the time resource used for transmission of the first TB.

According to a third aspect, an embodiment of this application provides a communications device. The communications device is specifically a first communications device, and the first communications device includes a processing module and a transceiver module.

The transceiver module is configured to receive control information sent by a second communications device. The control information is used to schedule a plurality of transport blocks TBs, the control information includes redundancy version RV indication information, a quantity of bits occupied by the RV indication information is less than 2M bits, and M is a maximum quantity of TBs that can be scheduled based on the control information.

The processing module is configured to: determine a first parameter through pre-specifying, determine the first parameter by receiving, by the transceiver module, physical layer signaling sent by the second communications device, or determine the first parameter by receiving, by the transceiver module, higher layer signaling sent by the second communications device. The first parameter is a parameter related to a first RV corresponding to a first TB, the first TB is one of the plurality of TBs scheduled based on the control information, the first RV is an RV used in starting k time units in a time resource used for transmission of the first TB, and k is a positive integer.

The processing module is configured to determine the first RV based on the first parameter.

The processing module is configured to determine, for the first TB based on the first RV and a predetermined RV updating sequence, an RV used in a time unit other than the k time units in the time resource used for transmission of the first TB.

In a possible design of the third aspect, the processing module is configured to: perform a modulo operation on the first parameter based on a hybrid automatic repeat request HARQ process number corresponding to the first TB, and use, as the first RV, a result obtained by performing the modulo operation; or perform a modulo operation on the first parameter based on a transport block index corresponding to the first TB, and use, as the first RV, a result obtained by performing the modulo operation.

In a possible design of the third aspect, the processing module is configured to: determine that the first parameter indicates that the RV indication information includes N RV fields, where each RV field indicates one RV, and N is a positive integer; and determine that an RV indicated by the $(i+1)^{th}$ RV field in the RV indication information is the first RV.

i is a result obtained by performing a modulo operation on the first parameter based on a HARQ process number corresponding to the first TB, or i is a result obtained by performing a modulo operation on the first parameter based on a transport block index corresponding to the first TB.

In a possible design of the third aspect, the processing module is configured to: determine bundling that is to be performed on a response feedback of the first TB and a response feedback of a second TB in the plurality of TBs and that is indicated by the first parameter, where the first TB and the second TB have a same RV, and determine, based on an RV field included in the RV indication information, the first RV corresponding to the first TB; or determine a newly to-be-transmitted TB that is scheduled based on the control information and that is indicated by the first parameter, where newly to-be-transmitted TBs have a same RV, and determine, based on an RV field included in the RV indication information, the first RV corresponding to the first TB when the first TB is the newly to-be-transmitted TB; and/or determine a to-be-retransmitted TB that is scheduled based on the control information and that is indicated by the first parameter, where to-be-retransmitted TBs have a same RV, and determine, based on an RV field included in the RV indication information, the first RV corresponding to the first TB when the first TB is a to-be-retransmitted TB.

In a possible design of the third aspect, the processing module is configured to: determine an RV set indicated by the first parameter, and determine that an RV that is in the RV set and that is indicated by an RV field included in the RV indication information is the first RV, or determine an RV offset value indicated by the first parameter, and perform offset based on the RV offset value and an RV indicated by an RV field included in the RV indication information, where a result obtained after offset is the first RV.

In a possible design of the third aspect, the processing module is configured to: determine a quantity of RV fields or a quantity of RV values that corresponds to a repetition quantity and that is indicated by the first parameter; and determine a bit state of a first field that is included in the control information, and determine the first RV according to a one-to-one correspondence between a bit state of the first field and three parameters, where the three parameters include the repetition quantity, whether to enable frequency hopping, and the first RV; or determine a bit state of a first field that is included in the control information, and determine the first RV according to a one-to-one correspondence between a bit state of the first field and four parameters, where the four parameters include a quantity of TBs scheduled based on the control information, the repetition quantity, whether to enable frequency hopping, and the first RV.

In a possible design of the third aspect, the control information indicates the repetition quantity, and the repetition quantity is a repetition quantity of the control information or a repetition quantity of a data channel for transmitting a TB; and the processing module is configured to: when the repetition quantity belongs to a first repetition quantity set, determine, based on received higher layer signaling sent by the second communications device, to enable or disable frequency hopping, and when the repetition quantity belongs to a second repetition quantity set, determine, based on the control information, to enable or disable frequency hopping; or when the repetition quantity belongs to a first repetition quantity set, determine not to enable frequency hopping, and when the repetition quantity belongs to a second repetition quantity set, determine, based on the control information, to enable or disable frequency hopping.

In a possible design of the third aspect, the control information indicates the repetition quantity, and the repetition quantity is a repetition quantity of the control information or a repetition quantity of a data channel for transmitting a TB; and the processing module is configured to: when the repetition quantity belongs to a first repetition quantity set, determine that the RV indication information indicates the first RV in S RV fields or S RV values, and when the repetition quantity belongs to a second repetition quantity set, determine that the control information indicates the first RV in T RV fields or S RV values, where is less than S, a quantity of repetition quantities included in the second repetition quantity set is greater than a quantity of repetition quantities included in the first repetition quantity set, and T and S each are a positive integer; or when the repetition quantity belongs to a first repetition quantity set, determine that the control information indicates the first RV in S RV fields or S RV values, and when the repetition quantity belongs to a second repetition quantity set, determine that the first RV is a specific RV.

In a possible design of the third aspect, the processing module is configured to change, at intervals of time units whose quantity is a second parameter and based on the first RV corresponding to the first TB and the predetermined RV updating sequence, the RV used for the first TB in the time unit other than the k time units in the time resource used for transmission of the first TB.

In the third aspect of this application, modules that constitute the first communications device may further perform the steps described in the first aspect and the possible implementations. For details, refer to the description of the first aspect and the possible implementations.

According to a fourth aspect, an embodiment of this application further provides a communications device. The communications device is specifically a second communications device, and the second communications device includes a processing module and a transceiver module.

The transceiver module is configured to send control information to a first communications device. The control information is used to schedule a plurality of transport blocks TBs, the control information includes redundancy version RV indication information, a quantity of bits occupied by the RV indication information is less than 2M bits, and M is a maximum quantity of TBs that can be scheduled based on the control information.

The processing module is configured to determine a first RV of a first TB and a first parameter. The first TB is one of the plurality of TBs scheduled based on the control information, the first RV is an RV used in starting k time units in a time resource used for transmission of the first TB, k is a positive integer, and the first parameter is a parameter related to the first RV.

The transceiver module is configured to: send physical layer signaling to the first communications device, or send higher layer signaling to the first communications device. The physical layer signaling or the higher layer signaling carries the first parameter.

The processing module is configured to determine, for the first TB based on the first RV and a predetermined RV updating sequence, an RV used in a time unit other than the k time units in the time resource used for transmission of the first TB.

In a possible design of the fourth aspect, the processing module is configured to: determine the first parameter and a hybrid automatic repeat request HARQ process number corresponding to the first TB, and determine the first RV based on an association relationship between the hybrid automatic repeat request HARQ process number corresponding to the first TB and the first parameter; or determine the first parameter and a transport block index corresponding to the first TB, and determine the first RV based on an association relationship between the transport block index corresponding to the first TB and the first parameter.

In a possible design of the fourth aspect, the processing module is configured to: determine that an RV indicated by the $(i+1)^{th}$ RV field in the RV indication information is the first RV, where i is a result obtained by performing a modulo operation on the first parameter based on a HARQ process number corresponding to the first TB, or i is a result obtained by performing a modulo operation on the first parameter based on a transport block index corresponding to the first TB; and configure that the first parameter indicates that the RV indication information includes N RV fields, where each RV field indicates one RV and N is a positive integer.

In a possible design of the fourth aspect, the processing module is configured to: configure that the first parameter indicates to bundle a response feedback of the first TB and a response feedback of a second TB in the plurality of TBs, where the first TB and the second TB have a same RV, and an RV field included in the RV indication information in the control information indicates the first RV corresponding to the first TB; or determine the first RV corresponding to the first TB when the first TB is the newly to-be-transmitted TB, configure that the first parameter indicates a newly to-be-transmitted TB scheduled based on the control information, where newly to-be-transmitted TBs have a same RV, and use an RV field included in the RV indication information to indicate the first RV; and/or determine the first RV corresponding to the first TB when the first TB is a to-be-retransmitted TB, configure a to-be-retransmitted TB that is scheduled based on the control information and that is indicated by the first parameter, where: to-be-retransmitted TBs have a same RV, and use an RV field included in the RV indication information to indicate the first RV.

In a possible design of the fourth aspect, the processing module is configured to: determine that an RV that is in an RV set and that is indicated by an RV field included in the RV indication information is the first RV, and configure an RV set indicated by the first parameter; or determine an RV indicated by an RV field included in the RV indication information, determine the first RV that corresponds to the first TB and that is configured for the first communications device, determine an RV offset value used when offset is performed based on the RV indicated by the RV field included in the RV indication information, to obtain the first RV, and set the RV offset value indicated by the first parameter.

In a possible design of the fourth aspect, the processing module is configured to: configure a quantity of RV fields or a quantity of RV values that corresponds to a repetition quantity and that is indicated by the first parameter; and determine the first RV that corresponds to the first TB and that is configured for the first communications device, determine a bit state of a first field according to a one-to-one correspondence between a bit state of the first field and three parameters, and configure the bit state of the first field that is included in the control information, where the three parameters include the repetition quantity, whether to enable frequency hopping, and the first RV; or determine the first RV that corresponds to the first TB and that is configured for the first communications device, determine a bit state of a first field according to a one-to-one correspondence between a bit state of the first field and four parameters, and configure the bit state of a first field that is included in the control information, where the four parameters include a quantity of TBs scheduled based on the control information, the repetition quantity, whether to enable frequency hopping, and the first RV.

In a possible design of the fourth aspect, the control information indicates the repetition quantity, and the repetition quantity is a repetition quantity of the control information or a repetition quantity of a data channel for transmitting a TB; and the processing module is configured to: when the repetition quantity belongs to a first repetition quantity set, configure, based on a case of enabling or disabling frequency hopping, the higher layer signaling sent by the second communications device, and when the repetition quantity belongs to a second repetition quantity set, configure the control information based on the case of enabling or disabling frequency hopping; or when the repetition quantity belongs to a first repetition quantity set, determine not to enable frequency hopping, and when the repetition quantity belongs to a second repetition quantity set, configure the control information based on the case of enabling or disabling frequency hopping.

In a possible design of the fourth aspect, the control information indicates the repetition quantity, and the repetition quantity is a repetition quantity of the control information or a repetition quantity of a data channel for transmitting a TB; and the processing module is configured to: when the repetition quantity belongs to a first repetition quantity set, determine that the RV indication information indicates the first RV in S RV fields or S RV values, and when the repetition quantity belongs to a second repetition quantity set, determine that the control information indicates the first RV in T RV fields or S RV values, where T is less than S, a quantity of repetition quantities included in the second repetition quantity set is greater than a quantity of repetition quantities included in the first repetition quantity set, and T and S each are a positive integer or when the repetition quantity belongs to a first repetition quantity set, determine that the control information indicates the first RV in S RV fields or S RV values, and when the repetition quantity belongs to a second repetition quantity set, determine that the first RV is a specific RV.

In a possible design of the fourth aspect, the processing module is configured to change, at intervals of time units whose quantity is a second parameter and based on the first RV corresponding to the first TB and the predetermined RV updating sequence, the RV used for the first TB in the time unit other than the k time units in the time resource used for transmission of the first TB.

In the fourth aspect of this application, modules that constitute the second communications device may further perform the steps described in the second aspect and the possible implementations. For details, refer to the description of the second aspect and the possible implementations.

According to a fifth aspect, an embodiment of this application provides a computer-readable storage medium. The computer-readable storage medium stores instructions, and when the instructions are run on a computer, the computer is enabled to perform the method according to the first aspect or the second aspect.

According to a sixth aspect, an embodiment of this application provides a computer program product including instructions. When the instructions are run on a computer, the computer is enabled to perform the method according to the first aspect or the second aspect.

According to a seventh aspect, an embodiment of this application provides a communications device. The communications device may include an entity such as a terminal device or a network device, and the communications device includes a processor and a memory. The memory is configured to store instructions, and the processor is configured to execute the instructions in the memory, so that the communications device performs the method according to either one of the first aspect and the second aspect.

According to an eighth aspect, this application provides a chip system. The chip system includes a processor, configured to support a communications device in implementing a function in the foregoing aspects, for example, sending or processing data and/or information in the foregoing methods. In a possible design, the chip system further includes a memory, and the memory is configured to store a program instruction and data that are necessary for the communications device. The chip system may include a chip, or include a chip and another discrete device.

DESCRIPTION OF EMBODIMENTS

Figure 1:
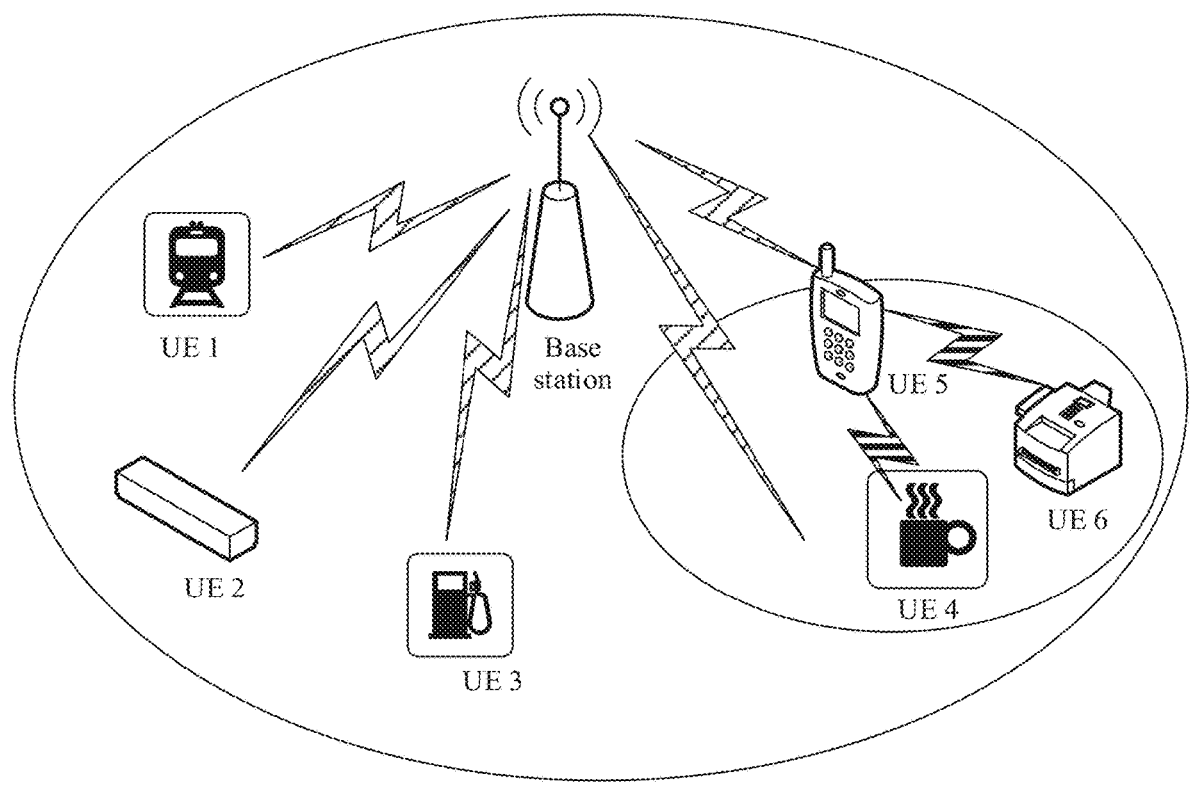
FIG. 1 is a schematic diagram of a system architecture of an information transmission method according to an embodiment of this application.

Embodiments of this application provide an information transmission method and a device, to reduce indication overheads of scheduling a transport block based on CI, and reduce occupied transmission resources.

The following describes the embodiments of this application with reference to accompanying drawings.

In the specification, claims, and accompanying drawings of this application, the terms "first", "second", and the like are intended to distinguish between similar objects but do not necessarily indicate a specific order or sequence. It should be understood that the terms used in such a way are interchangeable in proper circumstances, which is merely a discrimination manner that is used when objects having a same attribute are described in the embodiments of this application. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

The technical solutions in the embodiments of this application may be applied to various communications systems for data processing, for example, a code division multiple access (code division multiple access, CDMA) system, a time division multiple access (time division multiple access, TDMA) system, a frequency division multiple access (frequency division multiple access, FDMA) system, an orthogonal frequency division multiple access (orthogonal frequency-division multiple access, OFDMA) system, a single carrier frequency division multiple access (single carrier FDMA, SC-FDMA) system, and another system. The terms "system" and "network" may be changed with each other. A radio technology such as universal terrestrial radio access (universal terrestrial radio access, UTRA), or CDMA 2000 may be implemented in the CDMA system. The UTRA may include a wideband CDMA (wideband CDMA, WCDMA) technology and another CDMA variant technology. CDMA 2000 may cover an interim standard (interim standard, IS) 2000 (IS-2000), a standard IS-95, and a standard IS-856. A radio technology such as global system for mobile communications (global system for mobile communications, GSM) may be implemented in the TDMA system. A radio technology such as evolved universal terrestrial radio access (evolved UTRA, E-UTRA), ultra mobile broadband (ultra mobile broadband, UMB), IEEE 802.11 (Wi-Fi), IEEE 802.16 (WiMAX) IEEE 802.20, or the FLASH OFDMA may be implemented in the OFDMA system.

UTRA is based on a UMTS, and E-UTRA is based on an evolved version of the UMTS. A new version of the UMTS that uses the E-UTRA is used in long term evolution (long term evolution, LTE) and various versions evolved based on in 3GPP. A 5th generation (5th generation, "5G" for short) communications system and a new radio (New Radio, "NR" for short) communications system are next-generation communications systems under research. The technical solutions in the embodiments of this application may be applied to various communications systems such as a V2X communications system, an LTE-V communications system, a V2V communications system, an internet of vehicles communications system, an MTC communications system, an IoT communications system, an LTE-M communications system, an M2M communications system, and an internet of things communications system. In addition, the communications system may be further applicable to a future-oriented communications technology, and all technical solutions provided in the embodiments of this application are applicable. The system architecture and the service scenario described in the embodiments of this application are intended to describe the technical solutions in the embodiments of this application more clearly, and do not constitute a limitation on the technical solutions provided in the embodiments of this application. A person of ordinary skill in the art may learn that with the evolution of the network architecture and the emergence of new service scenarios, the technical solutions provided in the embodiments of this application are also applicable to similar technical problems.

The communications system provided in the embodiments of this application may include a first communications device and a second communications device, and data transmission may be performed between the first communications device and the second communications device. For example, the first communications device may include a terminal device, and the second communications device may include a network device. Alternatively, the first communications device may include one terminal device, and the second communications device may include another terminal device. Alternatively, the first communications device may include one network device, and the second communications device may include another network device.

In this application, transmission may be sending or receiving. When one side of communication performs sending, a peer device of communication performs receiving. A TB may be a TB for uplink transmission, or may be a TB for downlink transmission.

FIG. 1 is a schematic diagram of a structure of a possible radio access network (radio access network, RAN) according to an embodiment of this application. The RAN may be a base station access system of a 2G network (to be specific, the RAN includes a base station and a base station controller), may be a base station access system of a 3G network (to be specific, the RAN includes a base station and an RNC), may be a base station access system of a 4G network (to be specific, the RAN includes an eNB and an RNC), or may be a base station access system of a 5G network.

The RAN includes one or more network devices. The network device may be any device having a wireless transceiver function, or a chip disposed in the device having a wireless transceiver function, The network device includes but is not limited to a base station (for example, a base station (BS), a NodeB (NodeB), an evolved NodeB (eNodeB or eNB), a gNodeB (gNodeB) or gNB in a 5th generation (5G) communications system, a base station in a future communications system, an access node in a Wi-Fi system, a wireless relay node, and a wireless backhaul node), or the like. The base station may be a macro base station, a micro base station, a picocell base station, a small cell, a relay station, or the like. A plurality of base stations may support a network of one or more of the foregoing technologies, or a future evolved network. A core network may support a network of one or more of the foregoing technologies, or a future evolved network. The base station may include one or more co-located or non-co-located transmission and reception points (transmission and reception point, TRP). The network device may alternatively be a radio controller, a centralized unit (centralized unit, CU), a distributed unit (distributed unit, DU), or the like in a cloud radio access network (cloud radio access network, CRAN) scenario. The network device may alternatively be a server, a wearable device, a vehicle-mounted device, or the like. That the network device is a base station is used as an example for description below. The plurality of network devices may be a same type of base stations, or may be different types of base stations. The base station may communicate with terminal devices 1 to 6, or may communicate with the terminal devices 1 to 6 by using a relay station. The terminal devices 1 to 6 may support communication with a plurality of base stations of different technologies. For example, the terminal device may support communication with a base station supporting an LTE network, may support communication with a base station supporting the 5G network, or may support dual connections to a base station in LTE network and a base station in the 5G network. For example, a terminal is connected to a RAN node in a wireless network. Currently, examples of some RAN nodes are a gNB, a transmission and reception point (transmission and reception point, TRP), an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB, or a home NodeB (HNB)), a baseband unit (baseband unit, BBU), or a wireless fidelity (wireless fidelity, Wi-Fi) access point (access point, AP), or the like. In a network structure, the network device may include a centralized unit (centralized unit, CU) node, or a distributed unit (distributed unit, DU) node, or a RAN device including the CU node and the DU node.

The terminal devices 1 to 6 each are also referred to as user equipment (user equipment, UE), a mobile station (mobile station, MS), a mobile terminal (mobile terminal, MT), a terminal, or the like, and each are a device that provides voice and/or data connectivity to a user, or a chip disposed in the device, for example, a handheld device with a wireless connection function, or a vehicle-mounted device. Currently, examples of some terminal devices are a mobile phone (mobile phone), a tablet computer, a notebook computer, a palmtop computer, a mobile internet device (mobile internet device, MID), a wearable device, a virtual reality (virtual reality, VR) device, an augmented reality (augmented reality, AR) device, a wireless terminal in industrial control (industrial control), a wireless terminal in self driving (self driving), a wireless terminal in remote surgery (remote surgery), a wireless terminal in smart grid, a wireless terminal in transportation safety (transportation safety), a wireless terminal in smart city (smart city), a wireless terminal in smart home (smart home), and the like. The terminal device provided in this embodiment of this application may be a low-complexity terminal device and/or a terminal device in a coverage enhancement mode A.

In this embodiment of this application, the base station and the UE 1 to the UE 6 form a communications system, and in the communications system, the base station sends one or more of system information, an RAR message, and a paging message to one or more of the UE 1 to the UE 6. In addition, the UE 4 to the UE 6 also form a communications system, and in the communications system, the UE 5 may function as a base station, and the UE 5 may send one or more of system information, control information, and a paging message to one or more of the UE 4 and the UE 6.

To resolve an existing problem that a redundancy version (redundancy version, RV) corresponding to a transport block (transport block, TB) cannot be indicated, an embodiment of this application provides the following information transmission method. The method is applicable to a scenario in which control information is used to schedule a transport block. In this embodiment of this application, the control information may specifically include downlink control information. In this embodiment of this application, control information sent by a second communications device to a first communications device includes RV indication information, and the RV indication information may indicate an RV value. For example, the RV indication information includes one or more RV fields, and each RV field may indicate an RV value. In this embodiment of this application, a quantity of bits occupied by the RV indication information is less than 2M bits, and M is a maximum quantity of TBs that can be scheduled based on the control information. In this embodiment of this application, the quantity of bits occupied by the RV indication information is less than two times of the maximum quantity of TBs. The specific quantity of bits occupied by the RV indication information included in the control information may be configured with reference to a specific scenario. This is not limited herein.

Figure 2:
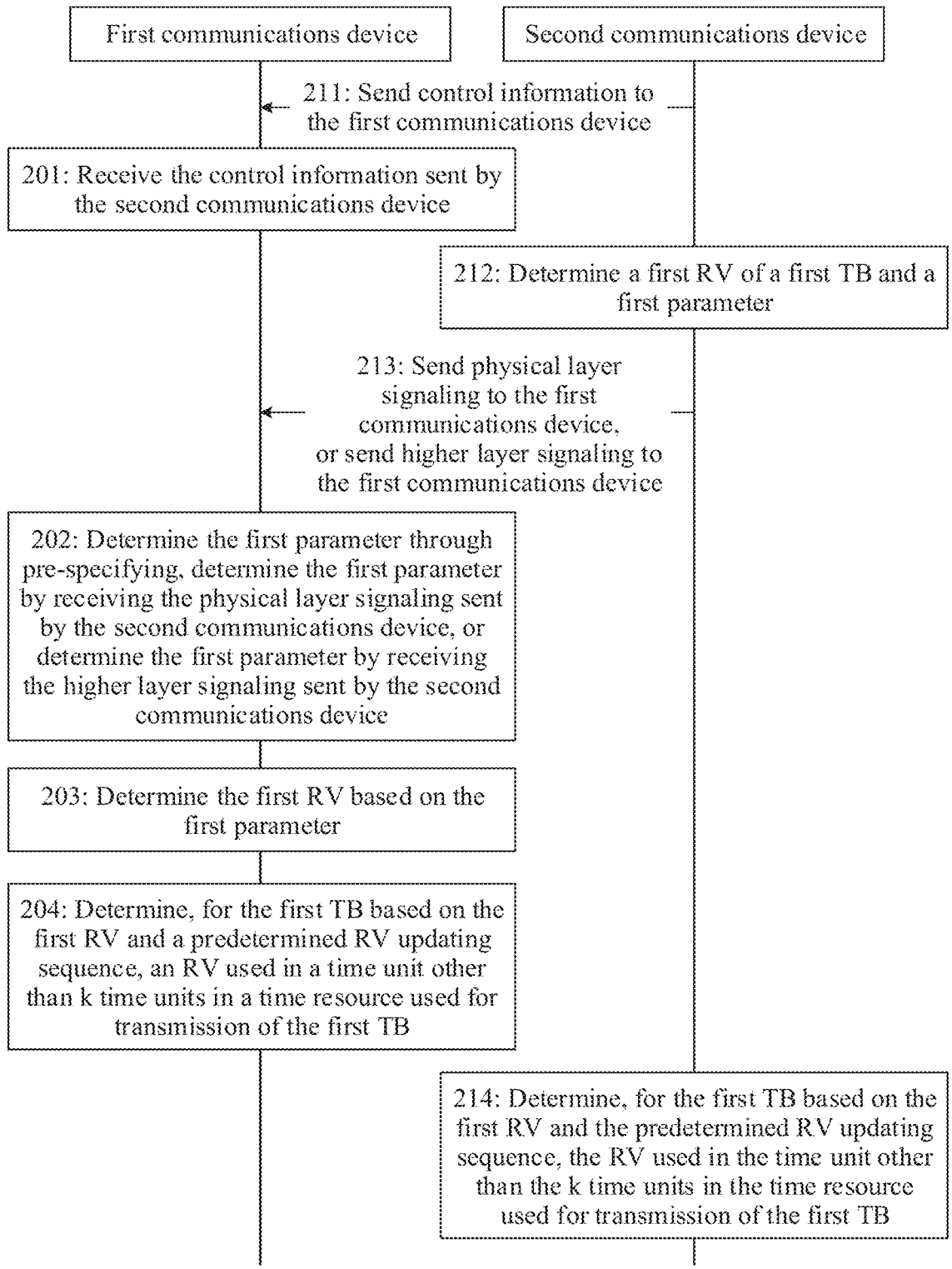
FIG. 2 is a schematic flowchart of interaction between a first communications device and a second communications device according to an embodiment of this application.

First, refer to FIG. 2. FIG. 2 is a schematic flowchart of interaction between a first communications device and a second communications device according to an embodiment of this application. For example, the first communications device may be the foregoing terminal device, and the second communications device may be the foregoing network device. An information transmission method provided in this embodiment of this application mainly includes the following steps.

211: The second communications device sends control information to the first communications device, where the control information is used to schedule a plurality of transport blocks TBs, the control information includes redundancy version RV indication information, a quantity of bits occupied by the RV indication information is less than 2M bits, and M is a maximum quantity of TBs that can be scheduled based on the control information.

201: The first communications device receives the control information sent by the second communications device, where the control information is used to schedule the plurality of TBs, the control information includes the RV indication information, the quantity of bits occupied by the RV indication information is less than 2M bits, and M is the maximum quantity of TBs that can be scheduled based on the control information.

In this embodiment of this application, the second communications device first sends the control information to the first communications device. The control information may be downlink control information, and the control information may be used to schedule the plurality of TBs. A quantity of TBs scheduled based on the control information is not limited herein, and specifically, may be determined by the second communications device based on a network environment, an available transmission resource, a data latency requirement, and the like. The control information sent by the second communications device carries the RV indication information, and the RV indication information may indicate one or more RV values. Assuming that the maximum quantity of TBs that can be scheduled based on the control information is M, the quantity of bits occupied by the RV indication information is less than 2M bits. For example, there are four RV values, and the four RV values are respectively 0, 2, 3, and 1. Therefore, the RV indication information may carry four RV fields, and each of the four RV fields may indicate an RV in {0, 2, 3, 1}. An RV corresponding to each of the plurality of TBs scheduled based on the control information may be a value indicated by one of the four RV fields. For details, refer to detailed description of an RV used for a first TB on a time resource in step 204 in a subsequent embodiment.

212: The second communications device determines a first RV of the first TB and a first parameter, where the first TB is one of the plurality of TBs scheduled based on the control information, the first RV is an RV used in starting k time units in a time resource used for transmission of the first TB, k is a positive integer, and the first parameter is a parameter related to the first RV.

In this embodiment of this application, the first communications device determines the first parameter, the first parameter is the parameter related to the first RV corresponding to the first TB, and the first parameter may be used to determine the first RV corresponding to the first TB. To implement indication of the first RV, the first communications device needs to obtain the first parameter, provided that the first parameter may indicate a value of the first RV For example, the first parameter may be a parameter used for calculating the first RV, or the first parameter may indicate a quantity of RV fields included in DCI, and each RV field indicates one RV. Alternatively, the first parameter may be information indicating that feedback responses of TBs are bundled together, or the first parameter may be information indicating a transmission type of a TB. The transmission type may include a to-be-retransmitted TB or a newly to-be-transmitted TB. Specific content included in the first parameter and specific information indicated by the first parameter are not limited herein.

There are a plurality of types of implementations of the first parameter. For example, the first parameter may be determined by the second communications device through pre-specifying. For example, it may be pre-specified that a value of the first parameter is 4 or another value (for example, the value of the first parameter is 2). This is not limited herein. When the second communications device determines the first parameter through pre-specifying, the first communications device may also determine the first parameter through pre-specifying. For example, the first communications device may also determine, through pre-specifying, that the value of the first parameter is 4 or another value (for example, the value of the first parameter is 2). This is not limited herein, For another example, the first parameter may alternatively be indicated by the second communications device to the first communications device. For example, the second communications device may send higher layer signaling, and the higher layer signaling may carry the first parameter. Therefore, the first communications device may receive the higher layer signaling, and parse the higher layer signaling to obtain the first parameter generated by the second communications device. For example, the higher layer signaling may include radio resource control (radio resource control, RRC) signaling, in addition, the second communications device may send physical layer signaling, and the physical layer signaling may include the first parameter. Therefore, the first communications device may receive the physical layer signaling, and parse the physical layer signaling to obtain the first parameter generated by the second communications device. For example, the physical layer signaling may be the control information. Further, the control information may include identification information.

In some embodiments of this application, the second communications device may determine the first parameter based on the determined first RV, and then determine to indicate the first parameter to the first communications device based on the first RV. Because the first parameter is the parameter related to the first RV, the first parameter may be determined based on the first RV corresponding to the first TB. When determining the first parameter, the second communications device configures specific content or the indicated value of the first parameter based on the determined first RV Detailed description is provided as an example below.

In some embodiments of this application, step 212 in which the second communications device determines a first RV of the first TB and a first parameter includes:

the second communications device determines the first parameter and a hybrid automatic repeat request HARQ process number corresponding to the first TB, and determines the first RV based on an association relationship between the hybrid automatic repeat request HARQ process number corresponding to the first TB and the first parameter; or the second communications device determines the first parameter and a transport block index corresponding to the first TB, and determines the first RV based on an association relationship between the transport block index corresponding to the first TB and the first parameter.

The second communications device first obtains the HARQ process number corresponding to the first TB. For example, the HARQ process number may be 0 or 1. For another example, the second communications device first obtains the transport block index corresponding to the first TB. For example, the transport block index may be any value from 0 to 7. In this embodiment of this application, the first RV corresponding to the first TB may be obtained through a modulo operation, to flexibly indicate an RV corresponding to a TB. All RVs corresponding to TBs do not need to be indicated by the RV indication information, to reduce overheads of the control information. When decoding performance is ensured and the overheads of the control information are proper, the control information indicates a start RV of one or more TBs.

In some embodiments of this application, step 212 in which the second communications device determines a first RV of the first TB and a first parameter includes:

the second communications device determines that an RV indicated by the $(i+1)^{th}$ RV field in the RV indication information is the first RV, where i is a result obtained by performing a modulo operation on the first parameter based on a HARQ process number corresponding to the first TB, or i is a result obtained by performing a modulo operation on the first parameter based on a transport block index corresponding to the first TB; and the second communications device sets that the first parameter indicates that the RV indication information includes N RV fields, where each RV field indicates one RV, and N is a positive integer.

In some embodiments of this application, step 212 in which the second communications device determines a first RV of the first TB and a first parameter includes:

the second communications device sets that the first parameter indicates to bundle a response feedback of the first TB and a response feedback of a second TB in the plurality of TBs, where the first TB and the second TB have a same RV, and an RV field included in the RV indication information in the control information sent by the second communications device indicates the first RV corresponding to the first TB; or the second communications device determines the first RV corresponding to the first TB when the first TB is the newly to-be-transmitted TB, the second communications device sets that the first parameter indicates a newly to-be-transmitted TB scheduled based on the control information, where newly to-be-transmitted TBs have a same RV, and the second communications device uses an RV field included in the RV indication information to indicate the first RV; and/or the second communications device determines the first RV corresponding to the first TB when the first TB is a to-be-retransmitted TB, the second communications device sets a to-be-retransmitted TB that is scheduled based on the control information and that is indicated by the first parameter, where to-be-retransmitted TBs have a same RV, and the second communications device uses an RV field included in the RV indication information to indicate the first RV.

In some embodiments of this application, step 212 in which the second communications device determines a first RV of the first TB and a first parameter includes:

the second communications device determines that an RV that is in an RV set and that is indicated by an RV field included in the RV indication information is the first RV, and the second communications device sets an RV set indicated by the first parameter; or the second communications device determines an RV indicated by an RV field included in the RV indication information, the second communications device determines the first RV that corresponds to the first TB and that is configured for the first communications device, the second communications device determines an RV offset value used when offset is performed based on the RV indicated by the RV field included in the RV indication information, to obtain the first RV, and the second communications device sets the RV offset value indicated by the first parameter.

In some embodiments of this application, step 212 in which the second communications device determines a first RV of the first TB and a first parameter includes:

the second communications device sets a quantity of RV fields or a quantity of RV values that corresponds to a repetition quantity and that is indicated by the first parameter; and the second communications device determines the first RV that corresponds to the first TB and that is configured for the first communications device, the second communications device determines a bit state of a first field according to a one-to-one correspondence between a bit state of the first field and three parameters, and the second communications device sets the bit state of the first field that is included in the control information, where the three parameters include the repetition quantity, whether to enable frequency hopping, and the first RV; or the second communications device determines the first RV that corresponds to the first TB and that is configured for the first communications device, the second communications device determines a bit state of a first field according to a one-to-one correspondence between a bit state of the first field and four parameters, and the second communications device sets the bit state of a first field that is included in the control information, where the four parameters include a quantity of TBs scheduled based on the control information, the repetition quantity, whether to enable frequency hopping, and the first RV.

In some embodiments of this application, in addition to the foregoing steps, the information transmission method provided in this embodiment of this application may further include the following steps:

the control information indicates the repetition quantity, and the repetition quantity is a repetition quantity of the control information or a repetition quantity of a data channel for transmitting a TB; and when the repetition quantity belongs to a first repetition quantity set, the second communications device configures, based on a case of enabling or disabling frequency hopping, the higher layer signaling sent by the second communications device, and when the repetition quantity belongs to a second repetition quantity set, the second communications device configures the control information based on the case of enabling or disabling frequency hopping; or when the repetition quantity belongs to a first repetition quantity set, the second communications device determines not to enable frequency hopping, and when the repetition quantity belongs to a second repetition quantity set, the second communications device configures the control information based on the case of enabling or disabling frequency hopping.

In some embodiments of this application, in addition to the foregoing steps, the information transmission method provided in this embodiment of this application may further include the following steps:

the control information indicates the repetition quantity, and the repetition quantity is a repetition quantity of the control information or a repetition quantity of a data channel for transmitting a TB; and when the repetition quantity belongs to a first repetition quantity set, the second communications device determines that the RV indication information indicates the first RV in S RV fields or S RV values, and when the repetition quantity belongs to a second repetition quantity set, the second communications device determines that the control information indicates the first RV in T RV fields or S RV values, where T is less than S, a quantity of repetition quantities included in the second repetition quantity set is greater than a quantity of repetition quantities included in the first repetition quantity set, and T and S each are a positive integer; or when the repetition quantity belongs to a first repetition quantity set, the second communications device determines that the control information indicates the first RV in S RV fields or S RV values, and when the repetition quantity belongs to a second repetition quantity set, the second communications device determines that the first RV is a specific RV.

For a process in which the second communications device side determines the first RV, refer to detailed description of determining the first RV by the first communications device side in a subsequent embodiment.

213: The second communications device sends the physical layer signaling to the first communications device, or sends the higher layer signaling to the first communications device, where the physical layer signaling or the higher layer signaling carries the first parameter.

202: The first communications device determines the first parameter through pre-specifying, determines the first parameter by receiving the physical layer signaling sent by the second communications device, or determines the first parameter by receiving the higher layer signaling sent by the second communications device, where the first parameter is the parameter related to the first RV corresponding to the first TB, the first TB is one of the plurality of TBs scheduled based on the control information, the first RV is the RV used in the starting k time units in the time resource used for transmission of the first TB, and k is a positive integer.

In this embodiment of this application, the first communications device determines the first parameter, the first parameter is the parameter related to the first RV corresponding to the first TB, the first parameter may be used to determine the first RV corresponding to the first TB. To implement the indication of the first RV, the first communications device needs to obtain the first parameter, provided that the first parameter may indicate the value of the first RV. For example, the first parameter may be a parameter used for calculating the first RV, or the first parameter may indicate the quantity of RV fields included in the DCI, and each RV field indicates one RV. Alternatively, the first parameter may be information indicating that the feedback responses of TBs are bundled together, or the first parameter may be information indicating a transmission type of a TB. The transmission type may include a to-be-retransmitted TB or a newly to-be-transmitted TB. Specific content included in the first parameter and specific information indicated by the first parameter are not limited herein.

There are a plurality of types of implementations of the first parameter. For example, the first parameter may be determined by the first communications device through pre-specifying. For example, it may be pre-specified that the value of the first parameter is 4 or another value (for example, the value of the first parameter is 2). This is not limited herein. When the first communications device determines the first parameter through pre-specifying, the second communications device may also determine the first parameter through pre-specifying. For example, the second communications device may also determine, through pre-specifying, that the value of the first parameter is 4 or another value (for example, the value of the first parameter is 2). This is not limited herein. For another example, the first parameter may alternatively be indicated by the second communications device to the first communications device. For example, the second communications device may send the higher layer signaling, and the higher layer signaling may carry the first parameter. Therefore, the first communications device may receive the higher layer signaling, and parse the higher layer signaling to obtain the first parameter generated by the second communications device. For example, the higher layer signaling may include the RRC signaling. In addition, the second communications device may send the physical layer signaling, and the physical layer signaling may include the first parameter. Therefore, the first communications device may receive the physical layer signaling, and parse the physical layer signaling to obtain the first parameter generated by the second communications device. For example, the physical layer signaling may be the control information. Further, the control information may include the identification information.

In this embodiment of this application, one of the plurality of TBs scheduled based on the control information may be the first TB, and the used in the starting k time units in the time resource used for transmission of the first TB is the first RV. For example, the first RV may be a start RV used for transmission of the first TB. The starting k time units in the time resource used for transmission of the first TB are the first k time units in the time resource used for transmission of the first TB. For example, a value of k may be 4. The RV used for the first TB in the first four time units in the time resource used for transmission of the first TB is the first RV corresponding to the first TB. A time resource used for transmission of a TB may include a plurality of time units, and the plurality of TBs are separately transmitted by using the plurality of time units in the time resource. The transmission herein includes: The first communications device sends data or information to the second communications device, and the second communications device sends data or information to the first communications device. There are a plurality of implementations of the time unit. For example, the time unit may include one or more symbols, a slot, or a subframe. Specifically, a specific implementation of the time unit may be determined based on an application scenario.

A manner of determining the first parameter is described below by using an example. For example, the value of the first parameter is pre-specified in a system, or a base station indicates the value of the first parameter. For example, it is pre-specified that the first parameter is equal to 4, or it is pre-specified that the first parameter is equal to 2. For another example, the base station indicates the value of the first parameter by using the higher layer signaling or the physical layer signaling. For example, the higher layer signaling or the physical layer signaling may carry configuration information of the first parameter, and the configuration information indicates the value of the first parameter.

In some embodiments of this application, the first parameter is determined based on one or more of a frequency hopping change interval parameter, an RV change interval parameter, a TB interleaving interval parameter, or the quantity of TBs scheduled based on the control information. Alternatively, the first parameter is used to determine one or more of a TB interleaving interval parameter, an RV change interval parameter, a frequency hopping change interval parameter, and a quantity of TBs scheduled based on the control information.

The first parameter may indicate the quantity of RV fields carried in the DCI, or indicate a quantity of RV fields configured by the higher layer signaling, and each RV field indicates one RV. Alternatively, a TB interleaving interval is determined based on the first parameter, or an RV change interval is determined based on the first parameter. Alternatively, the first parameter is determined based on a frequency hopping configuration parameter or the RV change interval parameter. For example, the frequency hopping configuration parameter indicates a frequency hopping interval, the frequency hopping interval indicates a quantity of consecutive absolute subframes in which a PxSCH remains on a same narrowband before the PxSCH hops to another narrowband, and the PxSCH may be a physical uplink shared channel (PUSCH), or may be a physical downlink shared channel (PDSCH). Similarly, the TB interleaving interval is a quantity of consecutive absolute subframes before one TB is switched to another TB. Similarly, the RV change interval is a quantity of consecutive absolute subframes before one RV value is switched to another RV value.

For example, the configuration information of the first parameter includes two bits, and the two bits are used to indicate a value in {1, 2, 4, 8}. Alternatively, the configuration information of the first parameter includes two bits, and the two bits are used to indicate a value in {1, 2, 4, X}. X is a quantity of TBs scheduled based on the DCI, or X is a maximum quantity, configured by the higher layer signaling, of TBs that can be scheduled based on the DCI.

For another example, the first parameter is determined based on a parameter Nacc configured by using the higher layer signaling or a parameter Ych configured by using the higher layer signaling, the parameter Nacc is the RV change interval parameter, and the parameter Ych is a frequency hopping interval parameter. Specifically, the first parameter may be the parameter Nacc configured by the higher layer signaling or the parameter Ych configured by the higher layer signaling. For another example, the first parameter is a factor. A product of the first parameter and a parameter Nacc configured by the higher layer signaling is an interval at which the plurality of TB blocks are interleaved or the RV change interval. Alternatively, a product of the first parameter and a parameter Ych configured by the higher layer signaling is an interval at which the plurality of TB blocks are interleaved or the RV change interval.

Alternatively, the first parameter is equal to a product of a parameter Nacc configured by the higher layer signaling and a quantity of TBs. Alternatively, the first parameter is equal to a product of a parameter Ych configured by the higher layer signaling and a quantity of TBs. Alternatively, the first parameter is equal to a product of an interleaving interval and a quantity of TBs.

In this embodiment of this application, a value of Nacc is shown in Table 1, and the data channel may include a PUSCH or a PDSCH. There is a same RV within Nacc absolute subframes, to facilitate a combination of transport blocks in the subframes.

| Coverage enhancement (coverage enhancement, CE) mode (mode) | Nacc |
| --- | --- |
| CE Mode A | 1 |
| CE Mode B | FDD: Nacc = 4; TDD: PUSCH Nacc = 5, and PDSCH Nacc = 10 |

Optionally, the quantity of RV fields indicated by the DCI is configured by the higher layer signaling or predefined. Alternatively, the DCI indicates RVs whose quantity is the first parameter.

When the quantity of TBs scheduled based on the DCI is less than or equal to P, each RV corresponds to one TB. When the quantity of TBs scheduled based on the DCI is greater than P, there is at least one RV corresponding to a plurality of TBs. For example, the DCI or the higher layer indicates P RVs. An RV corresponding to TBx is the $(i+1)^{th}$ RV in the P RVs. Herein, i={(HARQ index corresponding to TBx) mod P}.

203: The first communications device determines the first RV based on the first parameter.

In this embodiment of this application, the first communications device may determine the first parameter through pre-specifying or determine the first parameter through communication with the second communications device, and then determine, based on the first parameter, the first RV corresponding to the first TB. Because the first parameter is the parameter related to the first RV, the first RV corresponding to the first TB may be determined based on the first parameter. When determining the first RV the first communications device may determine the first RV based on information or a value indicated by the first parameter. Detailed description is provided as an example below.

In some embodiments of this application, for example, the first TB is TBx. In a subframe in which TBx is transmitted, subframes whose quantity is the first parameter are used as an RV change granularity, and an RV transmitted on a data channel transmission in the subframe used for transmission of TBx is determined based on an initial RV of TBx in a cyclic sequence of {0, 2, 3, 1}. The initial RV of TBx may be an RV indicated by the DCI or an RV configured by using the higher layer signaling.

Figure 3A:
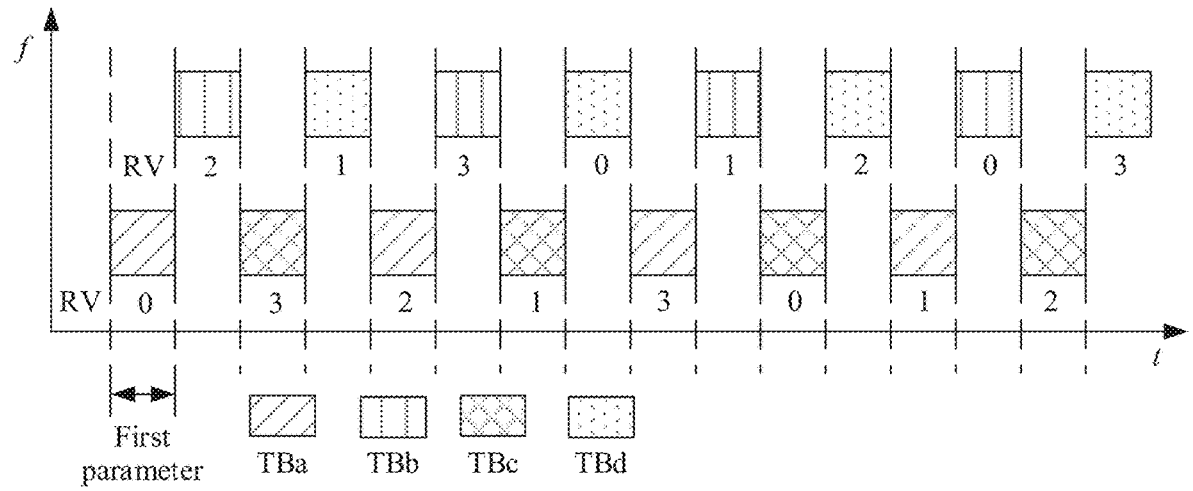
FIG. 3A is a schematic diagram of an RV configuration result according to an embodiment of this application.

FIG. 3A is a schematic diagram of an RV configuration result according to an embodiment of this application. It is assumed that the DCI is used to schedule four TBs, the four TBs are respectively TBa, TBb, TBc, and TBd, and start RVs of TBa, TBb, TBc, and TBd are respectively 0, 2, 3, and 1. The first parameter=Ych, and an RV used for transmission of each TB is shown in FIG. 3A.

Figure 3B:
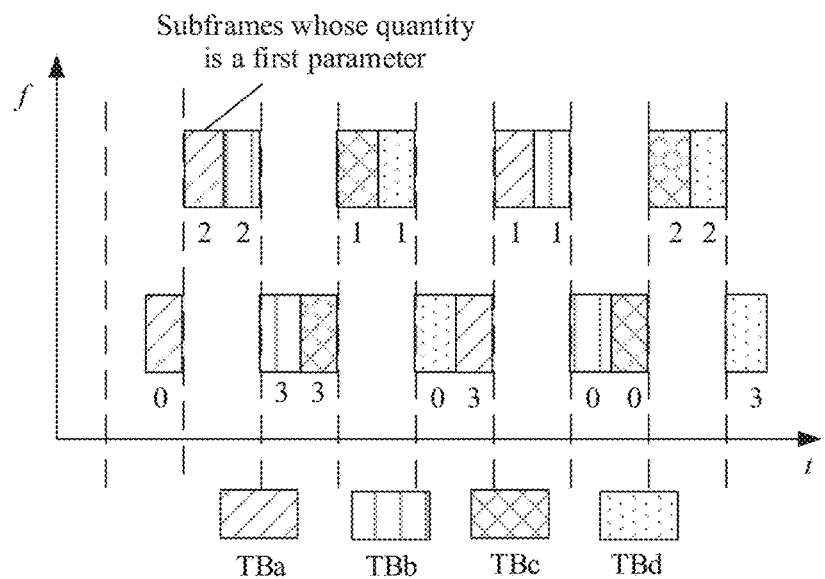
FIG. 3B is a schematic diagram of an RV configuration result according to an embodiment of this application.

FIG. 3B is a schematic diagram of another RV configuration result according to an embodiment of this application. It is assumed that the DCI is used to schedule four TBs, the four TBs are respectively TBa, TBb, TBc, and TBd, and start RVs of TBa, TBb, TBc, and TBd are respectively 0, 2, 3, and 1. The first parameter=Nacc=Ych/2. An RV used for transmission of each TB is shown in FIG. 3B.

In some embodiments of this application, step 203 in which the first communications device determines the first RV based on the first parameter includes:

the first communications device performs the modulo operation on the first parameter based on the hybrid automatic repeat request (hybrid automatic repeat request, HARQ) process number (process number) corresponding to the first TB, and uses, as the first RV, the result obtained by performing the modulo operation; or the first communications device performs the modulo operation on the first parameter based on the transport block index corresponding to the first TB, and uses, as the first RV the result obtained by performing the modulo operation.

The first communications device first obtains the HARQ process number corresponding to the first TB. For example, the HARQ process number may be 0 or 1. In this case, the first communications device may perform the modulo operation on the first parameter based on the process number corresponding to the first TB. In this case, the obtained result is used as the first RV corresponding to the first TB. For another example, the first communications device first obtains the transport block index corresponding to the first TB. For example, the transport block index may be any value from 0 to 7. In this case, the first communications device may perform the modulo operation on the first parameter based on the transport block index corresponding to the first TB. In this case, the obtained result is used as the first RV corresponding to the first TB. In this embodiment of this application, the first RV corresponding to the first TB may be obtained through the modulo operation, to flexibly indicate an RV corresponding to a TB. All RVs corresponding to TBs do not need to be indicated by the RV indication information, to reduce overheads of the control information. When decoding performance is ensured and the overheads of the control information are proper, the control information indicates the start RV of the one or more TBs.

For example, the RV corresponding to each of the one or more TBs scheduled based on the DCI is determined based on the first parameter, For example, the first TB is TBx, and the RV corresponding to TBx=(HARQ process number corresponding to TBx) mod first parameter; or RV corresponding to TBx=(Transport block index corresponding to TBx) mod first parameter.

Herein, mod is used to represent the modulo operation.

In this embodiment of this application, the DCI may not include the indication of the RV. The RV corresponding to each TB is determined based on the first parameter. The value of the first parameter may be indicated in the DCI, or may be configured by the higher layer signaling, or may be predefined. This is not limited herein.

Figure 4:
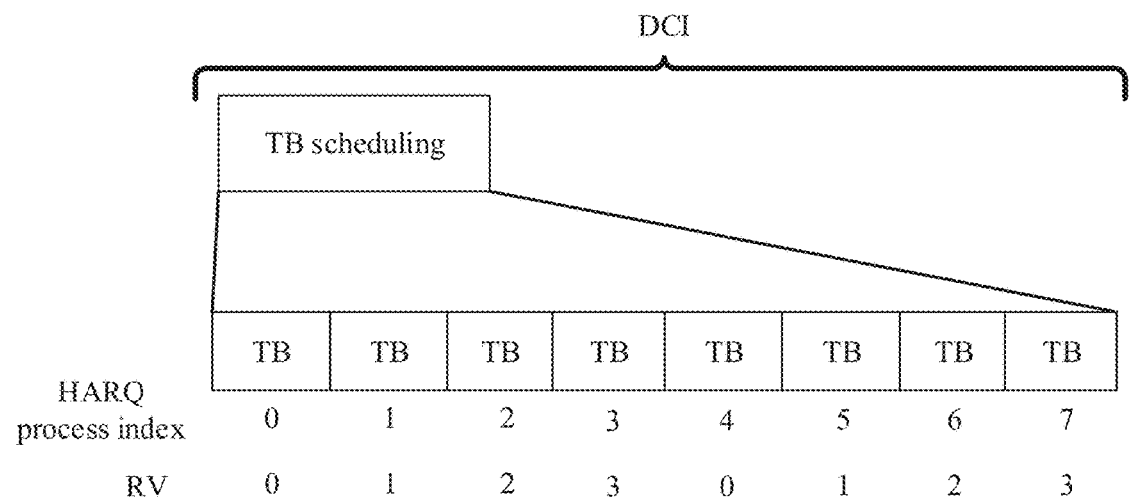
FIG. 4 is a schematic diagram of an RV configuration result according to an embodiment of this application.

FIG. 4 is a schematic diagram of an RV configuration result according to an embodiment of this application. The DCI may be used for TB scheduling, HARQ process numbers corresponding to TBx may be respectively 0 to 7, and the value of the first parameter may be 4. In this case, the modulo operation is performed, to obtain start RVs corresponding to eight TBs. The start RVs are respectively 0, 1, 2, 3, 0, 1, 2, and 3. After a start RV corresponding to each TB is obtained, all RVs used during transmission of each TB may be obtained based on a predetermined RV updating sequence. For details, refer to description in subsequent step 204.

In some other embodiments of this application, step 203 in which the first communications device determines the first RV based on the first parameter includes:

the first communications device determines that the first parameter indicates that the RV indication information includes N RV fields, where each RV field indicates one RV, and N is a positive integer; and the first communications device determines that an RV indicated by the $(i+1)^{th}$ RV field in the RV indication information is the first RV, where i is a result obtained by performing a modulo operation on the first parameter based on a HARQ process number corresponding to the first TB, or i is a result obtained by performing a modulo operation on the first parameter based on a transport block index corresponding to the first TB.

The first parameter indicates that the RV indication information includes N RV fields, each RV field indicates one RV, and N is a positive integer. For example, a value of N may be 4. For example, the first parameter indicates that a quantity of RV fields in the RV indication information is N, or the first parameter indicates whether the RV indication information includes the N RV fields. When the control information includes the N RV fields, the first communications device first performs the modulo operation based on the HARQ process number corresponding to the first TB and the first parameter, to determine i, or performs the modulo operation based on the transport block index corresponding to the first TB and the first parameter, to determine i. Then, the N RV fields included in the RV indication information is queried for the RV indicated by the $(i+1)^{th}$ RV field, and the RV that is indicated by the $(i+1)^{th}$ RV field and that is obtained through query is the first RV. Herein, the N fields may be queried in a cyclic query manner. In this embodiment of this application, the first RV corresponding to the first TB may be obtained through the modulo operation and by searching the N RV fields for the first RV to flexibly indicate an RV corresponding to a TB. All RVs corresponding to TBs do not need to be indicated by the RV indication information, to reduce overheads of the control information. When decoding performance is ensured and the overheads of the control information are proper, the control information indicates a start RV of the plurality of TBs.

For example, the first TB is TBx, and the RV corresponding to the TBx is determined based on the first parameter and information in the DCI.

For example, (HARQ process number corresponding to TBx) mod first parameter=i; or (Transport block index corresponding to TBx) mod first parameter=i.

The DCI includes RVs whose quantity is the first parameter, and the RV corresponding to TBx is the $(i+1)^{th}$ RV in the DCI. The value of the first parameter is configured by the higher layer signaling or pre-specified.

Figure 5:
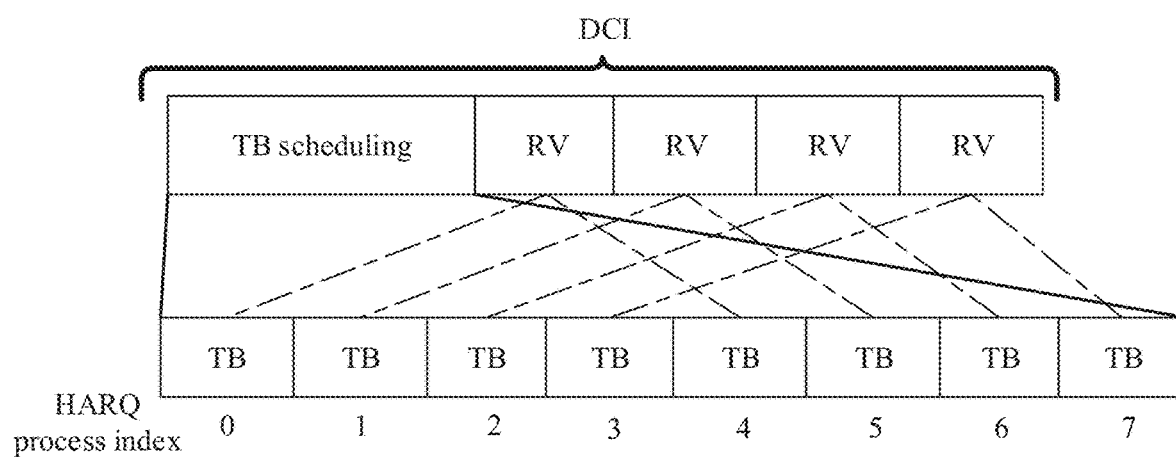
FIG. 5 is a schematic diagram of an RV configuration result according to an embodiment of this application.

FIG. 5 is a schematic diagram of an RV configuration result according to an embodiment of this application. It is assumed that the first parameter is equal to 4, a TB scheduling field in the DCI indicates that the DCI is used to schedule eight TBs, and HARQ process numbers corresponding to the eight TBs are respectively 0 to 7. The DCI further indicates four RVs. It is determined, based on the modulo operation on the HARQ process number corresponding to TBx and the first parameter, that the RV corresponding to TBx is an RV in the plurality of RVs that is indicated by the DCI. According to the foregoing formula, an RV of a TB whose HARQ index is 0 and an RV of a TB whose HARQ index is 4 are the same, and are both the $1^{st}$ RV indicated by the DCI. An RV of a TB whose HARQ index is 1 and an RV of a TB whose HARQ index is 5 are the same, and are both the $2^{nd}$ RV indicated by the DCI. An RV of a TB whose HARQ index is 2 and an RV of a TB whose HARQ index is 6 are the same, and are both the $3^{rd}$ RV indicated by the DCI. An RV of a TB whose HARQ index is 3 and an RV of a TB whose HARQ index is 7 are the same, and are both the $4^{th}$ RV indicated by the DCI.

A manner of determining RVs corresponding to the plurality of TBs in this embodiment of this application is described below by using an example. When the DCI schedules a plurality of TBs, the DCI includes an indication of one RV, and RVs of the plurality of TBs are determined according to a predefined rule. For example, an RV of the $1^{st}$ TB in the plurality of TBs is the RV indicated by the DCI. An RV of each of the plurality of TBs is determined at a granularity of a TB in a cyclic sequence of the RV updating sequence {0, 2, 3, 1}. Alternatively, the RVs of the plurality of TBs are determined in a unit of an RV change granularity in the cyclic sequence of {0, 2, 3, 1}.

For example, an RV of each of the plurality of TBs is determined at a granularity of a TB in a cyclic sequence of {0, 2, 3, 1}. It is assumed that the DCI is used to schedule four TBs, and the RV indicated by the DCI is 2. Therefore, the RV of the TB is the RV indicated by the DCI, namely, 2. An RV of the $2^{nd}$ TB in the plurality of TBs is determined in a sequence of {0, 2, 3, 1}, and then the RV of the $2^{nd}$ TB is 3. An RV of the $3^{rd}$ TB in the plurality of TBs is determined in a sequence of {0, 2, 3, 1}, and then the RV of the $3^{rd}$ TB is 1, An RV of the $4^{th}$ TB in the plurality of TBs is determined in a sequence of {0, 2, 3, 1}, and then the RV of the $4^{th}$ TB is 0.

For another example, when the DCI is used to schedule a plurality of TBs, the DCI includes an indication of one RV, and an RV of each of the plurality of TBs is determined at a granularity of an RV change based on a specific rule. The RV change granularity is a pre-specified value, or a value configured by the base station. In particular, RV change granularity=Ych. Herein, Ych is a frequency hopping indication or a parameter configured by the base station. In particular, RV change granularity=Nacc. Herein, Nacc is a parameter configured by the base station. Optionally, an RV corresponding to starting subframes whose quantity is the first parameter and that are of data transmission is indicated by the DCI or pre-specified. For example, when a repetition quantity of a TB is greater than K, an RV corresponding to the starting subframes whose quantity is the first parameter and that are of data transmission is pre-specified. When a repetition quantity of a TB is less than or equal to K, an RV corresponding to the starting subframes whose quantity is the first parameter and that are of data transmission is indicated by the DCI.

Figure 6A:
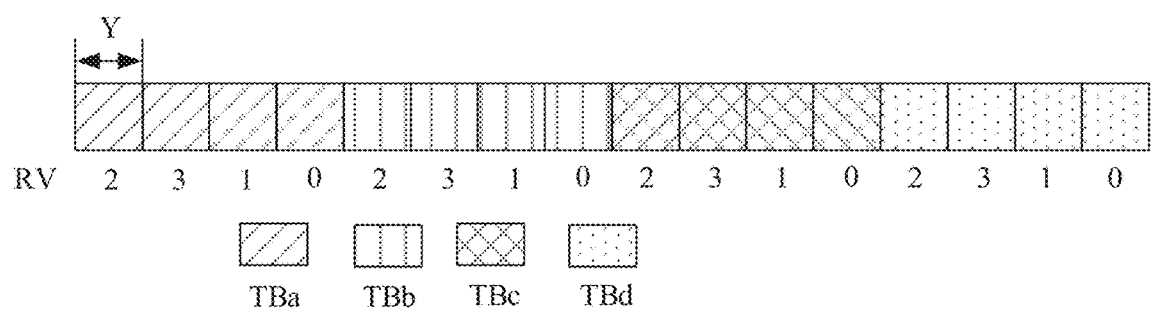
FIG. 6A is a schematic diagram of an RV configuration result according to an embodiment of this application.

FIG. 6A is a schematic diagram of an RV configuration result according to an embodiment of this application. For example, when the four TBs are not interleaved, an RV of each of the four TBs is determined at a granularity of the first parameter (denoted as Y) of subframes in a sequence of {0, 2, 3, 1}.

Figure 6B:
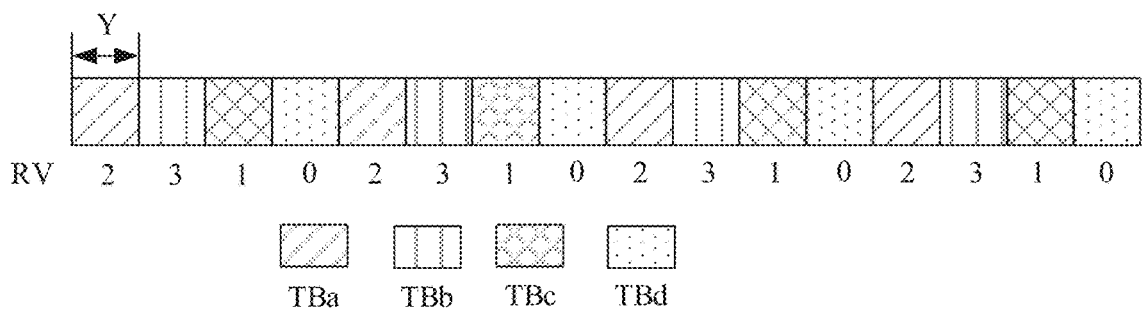
FIG. 6B is a schematic diagram of an RV configuration result according to an embodiment of this application.

FIG. 6B is a schematic diagram of an RV configuration result according to an embodiment of this application. For example, when the four TBs are interleaved, an RV of each of the four TBs is determined at a granularity of the first parameter (denoted as Y) of subframes in a sequence of {0, 2, 3, 1}.

Figure 6C:
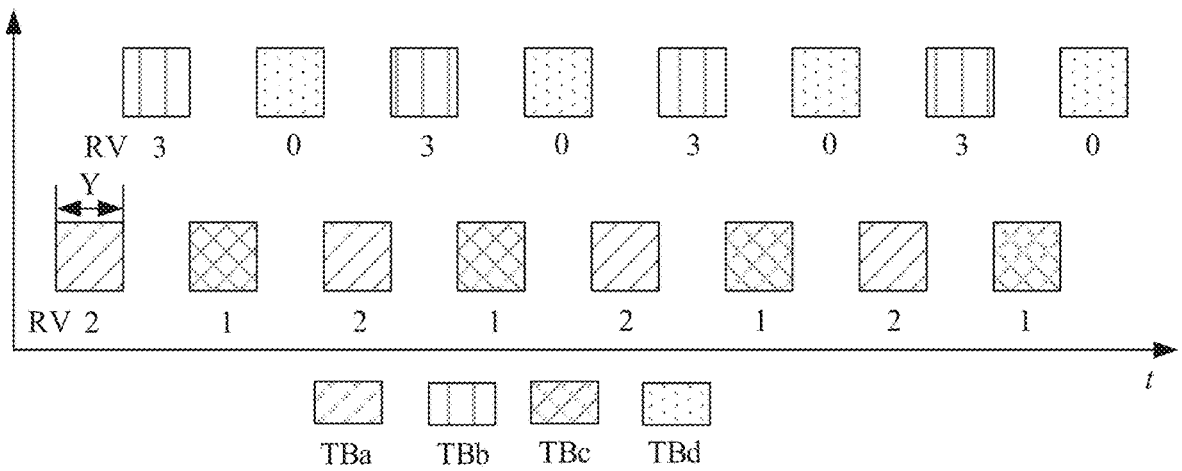
FIG. 6C is a schematic diagram of an RV configuration result according to an embodiment of this application.

FIG. 6C is a schematic diagram of an RV configuration result according to an embodiment of this application. For example, when the four TBs are interleaved and frequency hopping is performed on two frequency resource locations, an RV of each of the four TBs is determined at a granularity of the first parameter (denoted as Y) of subframes in a sequence of {0, 2, 3, 1}.

In some other embodiments of this application, step 203 in which the first communications device determines the first RV based on the first parameter includes:

the first communications device determines bundling that is to be performed on a response feedback of the first TB and a response feedback of a second TB in the plurality of TBs and that is indicated by the first parameter, where the first TB and the second TB have a same RV, and the first communications device determines, based on an RV field included in the RV indication information, the first RV corresponding to the first TB; or the first communications device determines a newly to-be-transmitted TB that is scheduled based on the control information and that is indicated by the first parameter, where newly to-be-transmitted TBs have a same RV and the first communications device determines, based on an RV field included in the RV indication information, the first RV corresponding to the first TB when the first TB is the newly to-be-transmitted TB; and/or the first communications device determines a to-be-retransmitted TB that is scheduled based on the control information and that is indicated by the first parameter, where to-be-retransmitted TBs have a same RV, and the first communications device determines, based on an RV field included in the RV indication information, the first RV corresponding to the first TB when the first TB is a to-be-retransmitted TB.

A response feedback of a TB means that during HARQ transmission, a response to data carried in the TB is an ACK or a NACK. For example, response feedback information of different TBs is bundled (bundling). For example, the response feedback of the first TB and the response feedback of the second TB are bundled. The first parameter may indicate to bundle the response feedback of the first TB and the response feedback of the second TB in the plurality of TBs. The DCI may indicate the first RV corresponding to the first TB. In this embodiment of this application, the first RV corresponding to the first TB may be obtained through bundling of response feedbacks, to flexibly indicate an RV corresponding to a TB. All RVs corresponding to TBs do not need to be indicated by the RV indication information, to reduce overheads of the control information. When decoding performance is ensured and the overheads of the control information are proper, the control information indicates the start RV of the plurality of TBs.

Figure 7:
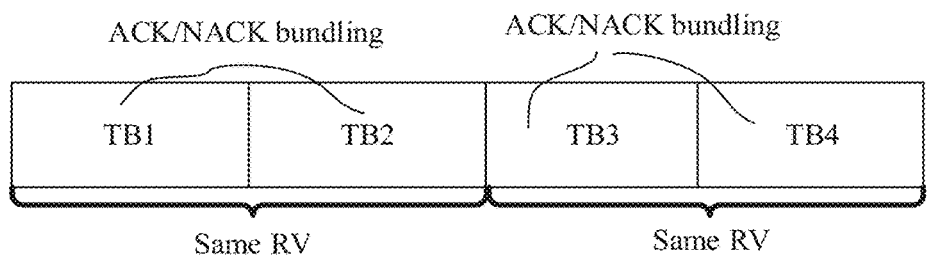
FIG. 7 is a schematic diagram of an RV configuration result according to an embodiment of this application.

For example, FIG. 7 is a schematic diagram of an RV configuration result according to an embodiment of this application. An RV is determined based on bundled TBs, or an RV is determined based on the newly to-be-transmitted TB and the to-be-retransmitted TB. For example, TBs whose ACK/NACK feedbacks are bundled have a same RV. The DCI is used to schedule four TBs. TB1 and TB2 whose ACK/NACK feedbacks are bundled, and TB3 and TB4 whose ACK/NACK feedbacks are bundled. Therefore, TB1 and TB2 have a same RV, and TB3 and TB4 have a same RV.

Transmission types of the plurality of TBs scheduled based on the control information may be retransmission or new transmission. In this case, newly to-be-transmitted TBs have a same RV, and the to-be-retransmitted TB have a same RV. Therefore, the first RV corresponding to the first TB may be determined based on whether a transmission type of the first TB is retransmission or new transmission. For example, when the transmission type is new transmission, an RV field in the RV indication information is used to indicate one RV and when the transmission type is retransmission, an RV field in the RV indication information is used to indicate one RV. Therefore, an RV of TBs with a same transmission type can be determined based on one RV field. In this embodiment of this application, the first RV corresponding to the first TB may be obtained based on the transmission type of the TBs, to flexibly indicate an RV corresponding to a TB. All RVs corresponding to TBs do not need to be indicated by the RV indication information, to reduce overheads of the control information. When decoding performance is ensured and the overheads of the control information are proper, the control information indicates the start RV of the plurality of TBs.

Figure 8:
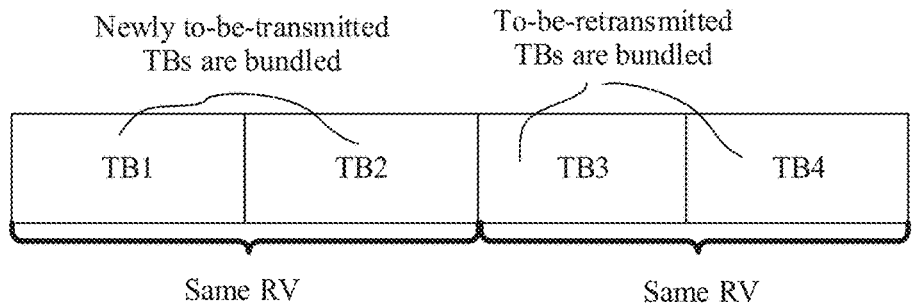
FIG. 8 is a schematic diagram of an RV configuration result according to an embodiment of this application.

For example, FIG. 8 is a schematic diagram of an RV configuration result according to an embodiment of this application. Newly to-be-transmitted TBs scheduled based on one piece of DCI have a same RV. A to-be-retransmitted TB scheduled based on one piece of DCI have a same RV.

In some embodiments of this application, step 203 in which the first communications device determines the first RV based on the first parameter includes:

the first communications device determines an RV set indicated by the first parameter, and the first communications device determines that an RV that is in the RV set and that is indicated by an RV field included in the RV indication information is the first RV; or the first communications device determines an RV offset value indicated by the first parameter, and the first communications device performs offset based on the RV offset value and an RV indicated by an RV field included in the RV indication information, where a result obtained after offset is the first RV.

The first parameter may be used to indicate an RV set, and an RV that is in the RV set and that is indicated by the RV field included in the RV indication information in the control information is the first RV. Therefore, in this embodiment of this application, the first RV corresponding to the first TB may be obtained based on the RV set indicated by the first parameter, to flexibly indicate an RV corresponding to a TB. All RVs corresponding to TBs do not need to be indicated by the RV indication information, to reduce overheads of the control information. When decoding performance is ensured and the overheads of the control information are proper, the control information indicates the start RV of the plurality of TBs.

In addition, in this embodiment of this application, the first RV corresponding to the first TB may be obtained based on the RV offset value indicated by the first parameter, to flexibly indicate an RV corresponding to a TB. All RVs corresponding to TBs do not need to be indicated by the RV indication information, to reduce overheads of the control information. When decoding performance is ensured and the overheads of the control information are proper, the control information indicates the start RV of the plurality of TBs.

For example, an RV set is configured by the higher layer signaling or an RV parameter is indicated by the higher layer signaling. The DCI indicates an RV in the RV set configured by the higher layer signaling. Alternatively, an RV used for data transmission is determined based on the RV parameter indicated by the higher layer signaling and the RV indicated by the DCI. For example, the RV set indicated by the higher layer signaling is {0, 3}, and the DCI uses 1 bit to indicate, in {0, 3}, whether the RV is 0 or 3. Alternatively, the RV parameter indicated by the higher layer signaling determines a value of RV offset. RV used for data transmission=RV indicated by DCI+RV offset. For example, RV offset={0, 1}, or RV offset={0, 2}.

In some embodiments of this application, step 203 in which the first communications device determines the first RV based on the first parameter includes:

the first communications device determines a quantity of RV fields or a quantity of RV values that is included in DCI, that corresponds to a repetition quantity, and that is indicated by the first parameter; and the first communications device determines a bit state of a first field that is included in the control information, and determines the first RV according to a one-to-one correspondence between a bit state of the first field and three parameters, where the three parameters include the repetition quantity, whether to enable frequency hopping, and the first RV; or the first communications device determines a bit state of a first field that is included in the control information, and determines the first RV according to a one-to-one correspondence between a bit state of the first field and four parameters, where the four parameters include a quantity of TBs scheduled based on the control information, the repetition quantity, whether to enable frequency hopping, and the first RV.

The first parameter may be further used to indicate the quantity of RV fields corresponding to the repetition quantity. A type of the repetition quantity in transmission of a TB is not limited in this embodiment of this application. For example, the repetition quantity is the repetition quantity of the control information or the repetition quantity of the data channel for transmitting the TB. For example, frequency hopping (frequency hopping, FH) is to be enabled or disabled by the higher layer signaling, and the DCI may indicate, in a bitmap manner, RVs whose quantity is the first parameter. Optionally, the value of the first parameter is equal to Q. FH is to be enabled or disabled by the higher layer signaling, and the DCI indicates Q RVs in the bitmap manner by using Q bits, or the DCI indicates the Q RVs in the bitmap manner by using 2 Q bits (two bits are required for an indication of each RV).

In this embodiment of this application, frequency hopping is also performed on one TB based on an absolute subframe. To be specific, after being transmitted in Ft consecutive subframes, the TB hops from one narrowband to another narrowband. A possible value of H is shown in Table 2.

| CE mode | H | |
|---|---|---|
| | TDD | FDD |
| CE mode A | {1, 5, 10, 20} | {1, 2, 4, 8} |
| CE mode B | {5, 10, 20, 40} | {2, 4, 8, 16} |

In this embodiment of this application, the first field is set in the control information. The first field may have a plurality of bit states. For example, when the first field is 6 bits, the first field has 64 bit states. For another example, the first field may be 10 bits or 11 bits, The first field may be used to indicate a combination of three parameters, or indicate a combination of four parameters. To be specific, the first RV is determined according to the one-to-one correspondence between a bit state of the first field and the three parameters, and the three parameters include the repetition quantity, whether to enable frequency hopping, and the first RV. Alternatively, the first RV is determined according to the one-to-one correspondence between a bit state of the first field and four parameters, and the four parameters include the quantity of TBs scheduled based on the control information, the repetition quantity of repetition, whether to enable frequency hopping, and the first RV. Therefore, an RV corresponding to a TB can be flexibly indicated based on a correspondence between a bit state of the first field and a plurality of parameters. All RVs corresponding to TBs do not need to be indicated by the RV indication information, to reduce overheads of the control information. When decoding performance is ensured and the overheads of the control information are proper, the control information indicates the start RV of the plurality of TBs.

Further, in some embodiments of this application, the method provided in this embodiment of this application further includes:

the control information indicates the repetition quantity, and the repetition quantity is a repetition quantity of the control information or a repetition quantity of a data channel for transmitting a TB; and when the repetition quantity belongs to a first repetition quantity set, the first communications device determines, based on received higher layer signaling sent by the second communications device, to enable or disable frequency hopping, and when the repetition quantity belongs to a second repetition quantity set, the first communications device determines, based on the control information, to enable or disable frequency hopping; or when the repetition quantity belongs to a first repetition quantity set, the first communications device determines not to enable frequency hopping, and when the repetition quantity belongs to a second repetition quantity set, the first communications device determines, based on the control information, to enable or disable frequency hopping.

Specifically, when the repetition quantity is the first repetition quantity set, FH is to be enabled or disabled by the higher layer signaling. When the repetition quantity is the second repetition quantity set, the DCI is used to enable or disable FH. The second communications device may determine, based on a specific repetition quantity set to which the repetition quantity belongs, specific signaling that is used to indicate, to the first communications device, whether to perform frequency hopping, so that the first communications device may determine, based on indications of different signaling, whether to perform frequency hopping.

In some embodiments of this application, the method provided in this embodiment of this application further includes:

the control information indicates the repetition quantity, and the repetition quantity is a repetition quantity of the control information or a repetition quantity of a data channel for transmitting a TB; and when the repetition quantity belongs to a first repetition quantity set, the first communications device determines that the RV indication information indicates the first RV in S RV fields and/or S RV values, and when the repetition quantity belongs to a second repetition quantity set, the first communications device determines that the control information indicates the first RV in T RV fields and/or T RV values, where is less than S, a quantity of repetition quantities included in the second repetition quantity set is greater than a quantity of repetition quantities included in the first repetition quantity set, and T and S each are a positive integer; or when the repetition quantity belongs to a first repetition quantity set, the first communications device determines that the control information indicates the first RV in S RV fields and/or S RV values, and when the repetition quantity belongs to a second repetition quantity set, the first communications device determines that the first RV is a specific RV.

When the repetition quantity is the first repetition quantity set, the DCI indicates an RV in the S RV fields and/or the S RV values. When the repetition quantity is the second repetition quantity set, the DCI indicates an RV in T RV fields and/or T RV values, where T is less than S, or when the repetition quantity is the second repetition quantity set, an RV value is a specific RV value. The specific RV value is a pre-specified RV value or an RV value configured by the higher layer signaling. The repetition quantity may be a repetition quantity of the data channel or a repetition quantity of the DCI. For example, when the repetition quantity is equal to 1, the DCI indicates an RV in four RV values; and when the repetition quantity is greater than 1, the DCI indicates an RV in two RV values or the DCI does not indicate an RV. When the repetition quantity is the second repetition quantity set, RV values corresponding to all of the plurality of TBs scheduled based on the DCI are the same, in other words, are a specific RV value. Therefore, bit overheads of the DCI can be reduced.

For example, the DCI indicates a combination of an RV, a repetition quantity, and whether to perform frequency hopping. Alternatively, the DCI indicates a combination of a quantity of scheduled TBs, an RV, a repetition quantity, and whether to perform frequency hopping. When the repetition quantity is rj, the DCI includes RVs whose quantity is the first parameter. In addition, the RV corresponding to TBx is the (i+1)$^{th}$ RV in the DCI. (HARQ process number corresponding to TBx) mod first parameter=i; or (transport block index corresponding to TBx) mod first parameter=i. Herein, r1, r2, r3, and r4 are values of the repetition quantity. Specifically, r1=1.

Table 3 shows that DCI indicates, by using 6 bits, a combination of an RV value, a repetition quantity, and whether to perform frequency hopping. The value of the first parameter is equal to 4.

| Repetition quantity | RV value | Quantity of RV fields indicated by using DCI | FH indication | Quantity of combinations |
|---|---|---|---|---|
| r1 | Two RV values | 4 | Not to perform frequency hopping; or FH is to be enabled or disabled by a higher layer signaling | $2^4 = 16$ |
| r2 | Two RV values | 4 | DCI is used to enable or disable FH | $2^4 \times 2 = 32$ |
| r3 | Specific RV value | 0 | DCI is used to enable or disable FH | 2 |
| r4 | Specific RV value | 0 | DCI is used to enable or disable FH | 2 |

Table 4 shows that DCI indicates, by using 11 bits, a combination of a quantity of scheduled TBs, an RV value, a repetition quantity, and whether to perform frequency hopping. The value of the first parameter is equal to 2.

| Quantity of TBs | Repetition quantity | RV value | FH indication | Quantity of combinations |
|---|---|---|---|---|
| 1-8 | r1 | Two RV values | Not to perform frequency hopping | 2 + 4 + 8 + 16 + 32 + 64 + 128 + 256 = 510 |
| 1-8 | r2 | Two RV values | DCI is used to enable or disable FH | (2 + 4 + 8 + 16 + 32 + 64 + 128 + 256) × 2 = 1020 |
| 1-8 | r3 | Specific RV value | DCI is used to enable or disable FH | 2 × 8 = 16 |
| 1-8 | r4 | Specific RV value | DCI is used to enable or disable FH | 2 × 8 = 16 |

Table 5 shows that DCI indicates, by using 11 bits, a combination of a quantity of scheduled TBs, an RV value, a repetition quantity, and frequency hopping. The value of the first parameter is equal to 2.

| Quantity of TBs | Repetition quantity | RV value | FH indication | Quantity of combinations |
|---|---|---|---|---|
| 2-8 | r1 | Two RV values | Not to perform frequency hopping | 4 + 8 + 16 + 32 + 64 + 128 + 256 = 508 |
| 2-8 | r2 | Two RV values | DCI is used to enable or disable FH | (4 + 8 + 16 + 32 + 64 + 128 + 256) × 2 = 1016 |
| 2-8 | r3 | Specific RV value | DCI is used to enable or disable FH | 2 × 7 = 14 |
| 2-8 | r4 | Specific RV value | DCI is used to enable or disable FH | 2 × 7 = 14 |

In some embodiments of this application, identification information in the DCI or the higher layer signaling indicates a quantity set of TBs scheduled based on the DCI.

Figure 9:
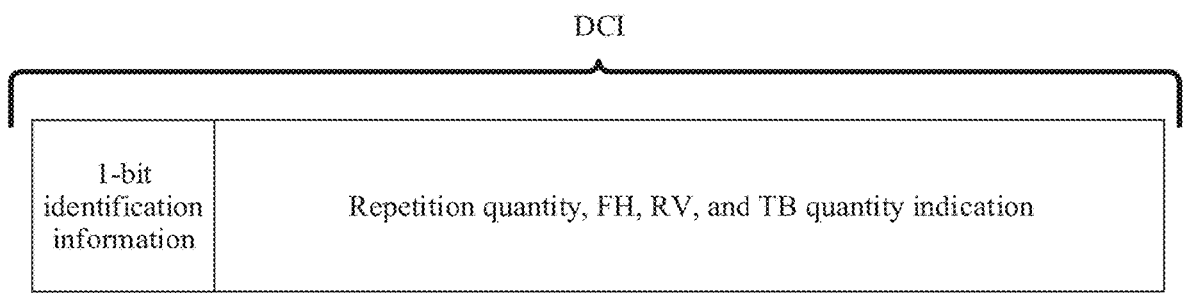
FIG. 9 is a schematic diagram of composition content of DCI according to an embodiment of this application.

FIG. 9 is a schematic diagram of composition content of DCI according to an embodiment of this application. The DCI includes 1-bit identification information, and the DCI may indicate a combination of a repetition quantity, FH, an RV, and a TB quantity indication. For example, when the identification information is 0, the DCI indicates the TB quantity in a first TB set. For example, when the identification information is 1, the DCI indicates the TB quantity in a second TB set. For example, a TB quantity included in the first TB set is {2, 4, 5, 8}, and a TB quantity included in the second TB set is {1, 3, 6, 7}. For example, a TB quantity included in the first TB set is {2, 3, 6, 8}, and a TB quantity included in the second TB set is {1, 4, 5, 7}. Alternatively, a first TB set existing when the repetition quantity is r1 and r2 is different from a first TB set existing when the repetition quantity is r3 and r4.

Table 6 shows that DCI indicates, by using 10 bits, a quantity of scheduled TBs, a repetition quantity, an RV, and FH.

| Quantity of TBs | Repetition quantity | RV value | FH indication |
|---|---|---|---|
| First TB set or second TB set | r1 | Two RV values | Not to perform frequency hopping |
| First TB set or second TB set | r2 | Two RV values | DCI is used to enable or disable FH |
| First TB set or second TB set | r3 | Specific RV value | DCI is used to enable or value disable FH |

-continued

| Quantity of TBs | Repetition quantity | RV value | FH indication |
|---|---|---|---|
| First TB set or second TB set | r4 | Specific RV value | DCI is used to enable or disable FH |

Table 7 shows a quantity of combinations corresponding to a first TB set and a second TB set. It is clearly that 10 bits are sufficient for indication. The 10 bits may indicate a combination corresponding to the first TB set, and indicate a quantity {n1, n2, n3, n4} of TBs, an RV, a repetition quantity, and FH. When the identification information is 0, {n1, n2, n3, n4} corresponds to four elements in the first TB set. When the identification information is 1, {n1, n2, n3, n4} corresponds to four elements in the second TB set.

| First TB set | Repetition quantity | RV value | FH indication | Quantity of combinations |
|---|---|---|---|---|
| 2, 4, 5, 8 | r1 | Two RV values | Not to perform frequency hopping | 4 + 16 + 32 + 256 = 308 |
| 2, 4, 5, 8 | r2 | Two RV values | DCI is used to enable or disable FH | (4 + 16 + 32 + 256) × 2 = 616 |
| 2, 4, 5, 8 | r3 | Specific RV value | DCI is used to enable or disable FH | 4 × 2 = 8 |
| 2, 4, 5, 8 | r4 | Specific RV value | DCI is used to enable or disable FH | 4 × 2 = 8 |

As shown in Table 8, when the identification information is 0, 10 bits are used to indicate a quantity of TBs, an RV, the repetition quantity, and FH in the first TB set. When the identification information is 1, 10 bits are used to indicate a quantity of TBs, an RV, the repetition quantity, and FH in the second TB set.

| Second TB set | Repetition quantity | RV value | FH indication | Quantity of combinations |
|---|---|---|---|---|
| 1, 3, 6, 7 | r1 | Two RV values | Not to perform frequency hopping | 2 + 8 + 64 + 128 = 202 |
| 1, 3, 6, 7 | r2 | Two RV values | DCI is used to enable or disable FR | (2 + 8 + 64 + 128) × 2 = 404 |
| 1, 3 6, 7 | r3 | Specific RV value | DCI is used to enable or disable FEI | 4 × 2 = 8 |
| 1, 3, 6, 7 | r4 | Specific RV value | DCI is used to enable or disable FH | 4 × 2 = 8 |

It can be learned from the example description in this embodiment of this application that, in this embodiment of this application, an RV of an initial subframe may be determined, to reduce overheads of the control information, ensure indication flexibility, and improve a data transmission success rate. In this embodiment of this application, TBs whose HARQ-ACK/NACKs are bundled have a same RV, or an RV is determined based on a HARQ process number, thereby improving indication flexibility, reducing overheads of a control channel, and increasing a data transmission success probability. In addition, in the solution of this embodiment of this application, all RVs and frequency hopping locations can be traversed for each TB, thereby improving a time-frequency diversity, and improving a transmission success probability.

204: The first communications device determines, for the first TB based on the first RV and a predetermined RV updating sequence, an RV used in a time unit other than the k time units in the time resource used for transmission of the first TB.

In this embodiment of this application, after the first communications device determines the first RV corresponding to the first TB, the first communications device may further pre-specify the RV updating sequence. The RV updating sequence is a sequence in which a plurality of RV values are sequentially updated. The RV used in the starting k time units in the time resource used for transmission of the first TB is the first RV. Therefore, the first communications device may determine, based on the first RV and the RV updating sequence, the RV used in the time unit other than the k time units in the time resource used for transmission of the first TB. The time unit other than the k time units in the time resource used for transmission of the first TB may be one or more time units starting from the $(k+1)^{th}$ time unit in the time resource used for transmission of the first TB. For example, if the first RV is the start RV used for transmission of the first TB, the first TB determines, based on the start RV and the RV updating sequence, another RV used for transmission of the first TB. A manner of obtaining a value of the RV used for transmission of the first TB is described in step 204. An RV used for transmission of another TB scheduled based on the control information may also be determined in the manner of obtaining the value of the RV used for transmission of the first TB. This is not limited. A manner of obtaining a value of the RV used for transmission of another TB scheduled by the control information is not described herein one by one.

For example, on a data channel carrying the first TB, the RV value is changed once every Nacc absolute subframes, Nacc is an RV updating interval, the RV updating sequence is {0, 2, 3, 1}, and the first RV may be an RV in the RV updating sequence. For example, the first RV may be 0. In this case, a value of another RV used for transmission of the first TB starts from 2. The value of the another RV used for transmission of the first TB is 3 after an interval of Nacc subframes. In this sequence, the another RV used for transmission of the first TB is sequentially obtained.

In some embodiments of this application, that the first communications device determines, for the first TB based on the first RV and a predetermined RV updating sequence, an RV used in a time unit other than the k time units in the time resource used for transmission of the first TB includes:

the first communications device changes, at intervals of time units whose quantity is a second parameter and based on the first RV corresponding to the first TB and the predetermined RV updating sequence, the RV used for the first TB in the time unit other than the k time units in the time resource used for transmission of the first TB.

When configuring the RV used in the time unit other than the k time units in the time resource used for transmission of the first TB, the first communications device may further set the second parameter, to change, at intervals of time units whose quantity is the second parameter, the RV used for the first TB. Therefore, dynamic updating of RVs used for transmission of the plurality of TBs scheduled based on the control information is implemented.

Further, in some embodiments of this application, the second parameter is determined based on one or more of the frequency hopping change interval parameter, the TB interleaving interval parameter, or the quantity of TBs scheduled based on the control information.

A specific parameter (or parameters) that is in the frequency hopping change interval parameter, the TB interleaving interval parameter, or the quantity of TBs scheduled based on the control information and that is used to determine the second parameter may be flexibly determined by the second communications device based on a data transmission channel environment or a TB data scheduling requirement. This is not limited.

214: The second communications device determines, for the first TB based on the first RV and the predetermined RV updating sequence, the RV used in the time unit other than the k time units in the time resource used for transmission of the first TB.

After the second communications device determines the first RV corresponding to the first TB, the second communications device may further pre-specify the RV updating sequence. The RV updating sequence is a sequence in which a plurality of RV values are sequentially updated. The RV used in the starting k time units in the time resource used for transmission of the first TB is the first RV. Therefore, the second communications device may determine, based on the first RV and the RV updating sequence, the RV used in the time unit other than the k time units in the time resource used for transmission of the first TB. The time unit other than the k time units in the time resource used for transmission of the first TB may be one or more time units starting from the $(k+1)^{th}$ time unit in the time resource used for transmission of the first TB. For example, if the first RV is the start RV used for transmission of the first TB, the first TB determines, based on the start RV and the RV updating sequence, another RV used for transmission of the first TB. The manner of obtaining a value of the RV used for transmission of the first TB is described in step 214. The RV used for transmission of another TB scheduled based on the control information may also be determined in the manner of obtaining the value of the RV used for transmission of the first TB. This is not limited. The manner of obtaining a value of the RV used for transmission of another TB scheduled by the control information is not described herein one by one.

In some embodiments of this application, step 214 in which the second communications device determines, for the first TB based on the first RV and the predetermined RV updating sequence, the RV used in the time unit other than the k time units in the time resource used for transmission of the first TB includes:

the second communications device changes, at intervals of time units whose quantity is the second parameter and based on the first RV corresponding to the first TB and the predetermined RV updating sequence, the RV used for the first TB in the time unit other than the k time units in the time resource used for transmission of the first TB.

When configuring the RV used in the time unit other than the k time units in the time resource used for transmission of the first TB, the second communications device may further set the second parameter, to change, at intervals of time units whose quantity is the second parameter, the RV used for the first TB. Therefore, dynamic updating of RVs used for transmission of the plurality of TBs scheduled based on the control information is implemented.

Further, in some embodiments of this application, the second parameter is determined based on one or more of the frequency hopping change interval parameter, the TB interleaving interval parameter, or the quantity of TBs scheduled based on the control information.

A specific parameter that is in the frequency hopping change interval parameter, the TB interleaving interval parameter, or the quantity of TBs scheduled based on the control information and that is used to determine the second parameter may be flexibly determined by the second communications device based on a data transmission channel environment or a TB data scheduling requirement. This is not limited.

It can be learned from the example description in the foregoing embodiment that, the first communications device receives the control information sent by the second communications device. The control information is used to schedule a plurality of transport blocks TBs. The control information includes the redundancy version RV indication information, the quantity of bits occupied by the RV indication information is less than 2M bits, and M is the maximum quantity of TBs that can be scheduled based on the control information. The first communications device determines the first parameter through pre-specifying, determines the first parameter by receiving the physical layer signaling sent by the second communications device, or determines the first parameter by receiving the higher layer signaling sent by the second communications device. The first parameter is the parameter related to the first RV corresponding to the first TB, the first TB is one of the plurality of TBs scheduled based on the control information, and the first RV is the RV used in the starting k time units in the time resource used for transmission of the first TB. The first communications device determines the first RV based on the first parameter. The first communications device determines, for the first TB based on the first RV and the predetermined RV updating sequence, the RV used in the time unit other than the k time units in the time resource used for transmission of the first TB. In this embodiment of this application, the quantity of bits occupied by the RV indication information included in the control information received by the first communications device is less than 2M bits, and the first communications device may determine the first RV based on the first parameter. In this embodiment of this application, an RV corresponding to a TB may be flexibly indicated based on the first parameter. All RVs corresponding to TBs do not need to be indicated by the RV indication information, to reduce overheads of the control information. When decoding performance is ensured and the overheads of the control information are proper, the control information indicates an RV used for transmission of one or more TBs.

It should be noted that, for brief description, the foregoing method embodiments are represented as a series of actions. However, a person skilled in the art should appreciate that this application is not limited to the described order of the actions, because according to this application, some steps may be performed in other orders or simultaneously. It should be further appreciated by a person skilled in the art that the embodiments described in this specification all belong to embodiments, and the involved actions and modules are not necessarily required by this application.

To better implement the foregoing solutions in the embodiments of this application, the following further provides a related apparatus used to implement the foregoing solutions.

Figure 10:
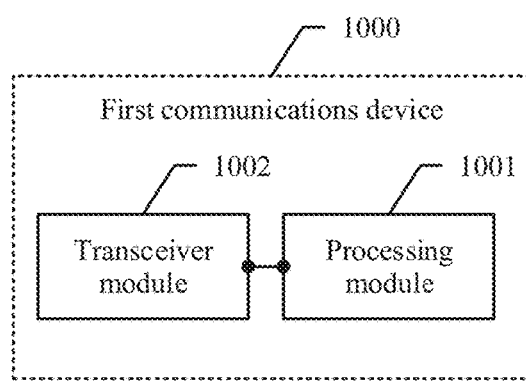
FIG. 10 is a schematic diagram of a structure of composition of a first communications device according to an embodiment of this application.

FIG. 10 is a schematic diagram of a structure of composition of a first communications device according to an embodiment of this application. A first communications device 1000 includes a processing module 1001 and a transceiver module 1002.

The transceiver module 1002 is configured to receive control information sent by a second communications device. The control information is used to schedule a plurality of transport blocks TBs, the control information includes redundancy version RV indication information, a quantity of bits occupied by the RV indication information is less than 2M bits, and M is a maximum quantity of TBs that can be scheduled based on the control information.

The processing module 1001 is configured to: determine a first parameter through pre-specifying, determine the first parameter by receiving, by the transceiver module, physical layer signaling sent by the second communications device, or determine the first parameter by receiving, by the transceiver module, higher layer signaling sent by the second communications device. The first parameter is a parameter related to a first RV corresponding to a first TB, the first TB is one of the plurality of TBs scheduled based on the control information, the first RV is an RV used in starting k time units in a time resource used for transmission of the first TB, and k is a positive integer.

The processing module 1001 is configured to determine the first RV based on the first parameter.

The processing module 1001 is configured to determine, for the first TB based on the first RV and a predetermined RV updating sequence, an RV used in a time unit other than the k time units in the time resource used for transmission of the first TB.

In some embodiments of this application, the processing module 1001 is configured to: perform a modulo operation on the first parameter based on a hybrid automatic repeat request HARQ process number corresponding to the first TB, and use, as the first RV, a result obtained by performing the modulo operation; or perform a modulo operation on the first parameter based on a transport block index corresponding to the first TB, and use, as the first RV, a result obtained by performing the modulo operation.

In some embodiments of this application, the processing module 1001 is configured to: determine that the first parameter indicates that the RV indication information includes N RV fields, where each RV field indicates one RV, and N is a positive integer; and determine that an RV indicated by the $(i+1)^{th}$ RV field in the RV indication information is the first RV.

i is a result obtained by performing a modulo operation on the first parameter based on a HARQ process number corresponding to the first TB, or i is a result obtained by performing a modulo operation on the first parameter based on a transport block index corresponding to the first TB.

In some embodiments of this application, the processing module 1001 is configured to: determine bundling that is to be performed on a response feedback of the first TB and a response feedback of a second TB in the plurality of TBs and that is indicated by the first parameter, where the first TB and the second TB have a same RV, and an RV field in DCI indicates the first RV of the first TB; or determine a newly to-be-transmitted TB that is scheduled based on the control information and that is indicated by the first parameter, where newly to-be-transmitted TBs have a same RV and determine, based on an RV field included in the RV indication information, the first RV corresponding to the first TB when the first TB is the newly to-be-transmitted TB; and/or determine a to-be-retransmitted TB that is scheduled based on the control information and that is indicated by the first parameter, where to-be-retransmitted TBs have a same RV, and determine, based on an RV field included in the RV indication information, the first RV corresponding to the first TB when the first TB is a to-be-retransmitted TB.

In some embodiments of this application, the processing module 1001 is configured to: determine an RV set indicated by the first parameter, and determine that an RV that is in the RV set and that is indicated by an RV field included in the RV indication information is the first RV; or determine an RV offset value indicated by the first parameter, and perform offset based on the RV offset value and an RV indicated by an RV field included in the RV indication information, where a result obtained after offset is the first RV.

In some embodiments of this application, the processing module 1001 is configured to: determine a quantity of RV fields and/or a quantity of RV values that corresponds to a repetition quantity and that is indicated by the first parameter; and determine a bit state of a first field that is included in the control information, and determine the first RV according to a one-to-one correspondence between a bit state of the first field and three parameters, where the three parameters include the repetition quantity, whether to enable frequency hopping, and the first RV; or determine a bit state of a first field that is included in the control information, and determine the first RV according to a one-to-one correspondence between a bit state of the first field and four parameters, where the four parameters include a quantity of TBs scheduled based on the control information, the repetition quantity, whether to enable frequency hopping, and the first RV.

In some embodiments of this application, the control information indicates the repetition quantity, and the repetition quantity is a repetition quantity of the control information or a repetition quantity of a data channel for transmitting a TB; and the processing module 1001 is configured to: when the repetition quantity belongs to a first repetition quantity set, determine, based on received higher layer signaling sent by the second communications device, to enable or disable frequency hopping, and when the repetition quantity belongs to a second repetition quantity set, determine, based on the control information, to enable or disable frequency hopping; or when the repetition quantity belongs to a first repetition quantity set, determine not to enable frequency hopping, and when the repetition quantity belongs to a second repetition quantity set, determine, based on the control information, to enable or disable frequency hopping.

In some embodiments of this application, the control information indicates the repetition quantity, and the repetition quantity is a repetition quantity of the control information or a repetition quantity of a data channel for transmitting a TB; and the processing module 1001 is configured to: when the repetition quantity belongs to a first repetition quantity set, determine that the RV indication information indicates the first RV in S RV fields and/or S RV values, and when the repetition quantity belongs to a second repetition quantity set, determine that the control information indicates the first RV in T RV fields and/or T RV values, where T is less than S, a quantity of repetition quantities included in the second repetition quantity set is greater than a quantity of repetition quantities included in the first repetition quantity set, and T and S each are a positive integer; or when the repetition quantity belongs to a first repetition quantity set, determine that the control information indicates the first RV in S RV fields and/or S RV values, and when the repetition quantity belongs to a second repetition quantity set, determine that the first RV is a specific RV.

In some embodiments of this application, the processing module 1001 is configured to change, at intervals of time units whose quantity is a second parameter and based on the first RV corresponding to the first TB and the predetermined RV updating sequence, the RV used for the first TB in the time unit other than the k time units in the time resource used for transmission of the first TB.

It can be learned from the example description in the foregoing embodiments that the first communications device receives the control information sent by the second communications device. The control information is used to schedule the plurality of transport blocks TBs, the control information includes the redundancy version RV indication information, the quantity of bits occupied by the RV indication information is less than 2M bits, and M is the maximum quantity of TBs that can be scheduled based on the control information. The first communications device determines the first parameter through pre-specifying, determines the first parameter by receiving the physical layer signaling sent by the second communications device, or determines the first parameter by receiving the higher layer signaling sent by the second communications device. The first parameter is the parameter related to the first RV corresponding to the first TB, the first TB is one of the plurality of TBs scheduled based on the control information, and the first RV is the RV used in the starting k time units in the time resource used for transmission of the first TB. The first communications device determines the first RV based on the first parameter. The first communications device determines, for the first TB based on the first RV and the predetermined RV updating sequence, the RV used in the time unit other than the k time units in the time resource used for transmission of the first TB. In this embodiment of this application, the quantity of bits occupied by the RV indication information included in the control information received by the first communications device is less than 2M bits, and the first communications device may determine the first RV based on the first parameter. In this embodiment of this application, an RV corresponding to a TB may be flexibly indicated based on the first parameter. All RVs corresponding to TBs do not need to be indicated by the RV indication information, to reduce overheads of the control information. When decoding performance is ensured and the overheads of the control information are proper, the control information indicates an RV used for transmission of one or more TBs.

Figure 11:
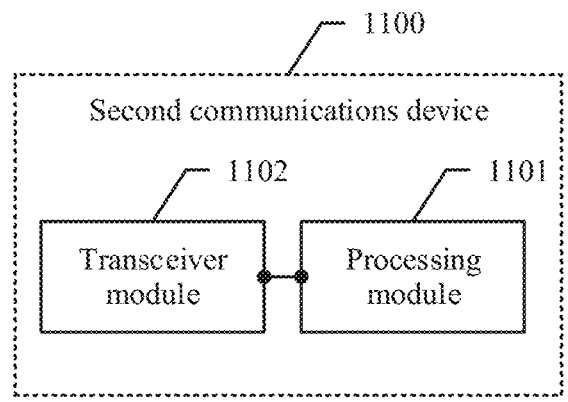
FIG. 11 is a schematic diagram of a structure of composition of a second communications device according to an embodiment of this application.

FIG. 11 is a schematic diagram of a structure of composition of a second communications device according to an embodiment of this application. The second communications device 1100 includes a processing module 1101 and a transceiver module 1102.

The transceiver module 1102 is configured to send control information to a first communications device. The control information is used to schedule a plurality of transport blocks TBs, the control information includes redundancy version RV indication information, a quantity of bits occupied by the RV indication information is less than 2M bits, and M is a maximum quantity of TBs that can be scheduled based on the control information.

The processing module 1101 is configured to determine a first RV of a first TB and a first parameter. The first TB is one of the plurality of TBs scheduled based on the control information, the first RV is an RV used in starting k time units in a time resource used for transmission of the first TB, k is a positive integer, and the first parameter is a parameter related to the first RV.

The transceiver module 1102 is configured to: send physical layer signaling to the first communications device, or send higher layer signaling to the first communications device. The physical layer signaling or the higher layer signaling carries the first parameter.

The processing module 1101 is configured to determine, for the first TB based on the first RV and a predetermined RV updating sequence, an RV used in a time unit other than the k time units in the time resource used for transmission of the first TB.

In some embodiments of this application, the processing module 1101 is configured to: determine the first RV corresponding to the first TB allocated to the first communications device; perform, by using the first RV, an inverse operation of a modulo operation on a hybrid automatic repeat request HARQ process number corresponding to the first TB, and use, as the first parameter, a result obtained through the inverse operation; or perform, by using the first RV, an inverse operation of a modulo operation on a transport block index corresponding to the first TB, and use, as the first parameter, a result obtained through the inverse operation.

In some embodiments of this application, the processing module 1101 is configured to: determine that an RV indicated by the $(i+1)^{th}$ RV field in the RV indication information is the first RV, where i is a result obtained by performing a modulo operation on the first parameter based on a HARQ process number corresponding to the first TB, or i is a result obtained by performing a modulo operation on the first parameter based on a transport block index corresponding to the first TB; and configure that the first parameter indicates that the RV indication information includes N RV fields, where each RV field indicates one RV and N is a positive integer.

In some embodiments of this application, the processing module 1101 is configured to: determine, based on an RV field included in the RV indication information, the first RV corresponding to the first TB, and configure that the first parameter indicates to bundle a response feedback of the first TB and a response feedback of a second TB in the plurality of TBs, where the first TB and the second TB have a same RV; or determine the first RV corresponding to the first TB when the first TB is a newly to-be-transmitted TB, configure that the first parameter indicates a newly to-be-transmitted TB scheduled based on the control information, where newly to-be-transmitted TBs have a same RV, and use an RV field included in the RV indication information to indicate the first RV; and/or determine the first RV corresponding to the first TB when the first TB is a to-be-retransmitted TB, configure a to-be-retransmitted TB that is scheduled based on the control information and that is indicated by the first parameter, where to-be-retransmitted TBs have a same RV, and use an RV field included in the RV indication information to indicate the first RV.

In some embodiments of this application, the processing module 1101 is configured to: determine that an RV that is in an RV set and that is indicated by an RV field included in the RV indication information is the first RV, and configure an RV set indicated by the first parameter; or determine an RV indicated by an RV field included in the RV indication information, determine the first RV that corresponds to the first TB and that is configured for the first communications device, determine an RV offset value used when offset is performed based on the RV indicated by the RV field included in the RV indication information, to obtain the first RV, and set the RV offset value indicated by the first parameter.

In some embodiments of this application, the processing module 1101 is configured to: configure a quantity of RV fields and/or a quantity of RV values that corresponds to a repetition quantity and that is indicated by the first parameter; and determine the first RV that corresponds to the first TB and that is configured for the first communications device, determine a bit state of a first field according to a one-to-one correspondence between a bit state of the first field and three parameters, and configure the bit state of the first field that is included in the control information, where the three parameters include the repetition quantity, whether to enable frequency hopping, and the first RV; or determine the first RV that corresponds to the first TB and that is configured for the first communications device, determine a bit state of a first field according to a one-to-one correspondence between a bit state of the first field and four parameters, and configure the bit state of a first field that is included in the control information, where the four parameters include a quantity of TBs scheduled based on the control information, the repetition quantity, whether to enable frequency hopping, and the first RV.

In some embodiments of this application, the control information indicates the repetition quantity, and the repetition quantity is a repetition quantity of the control information or a repetition quantity of a data channel for transmitting a TB; and the processing module 1101 is configured to: when the repetition quantity belongs to a first repetition quantity set, configure, based on a case of enabling or disabling frequency hopping, the higher layer signaling sent by the second communications device, and when the repetition quantity belongs to a second repetition quantity set, configure the control information based on the case of enabling or disabling frequency hopping; or when the repetition quantity belongs to a first repetition quantity set, determine not to enable frequency hopping, and when the repetition quantity belongs to a second repetition quantity set, configure the control information based on the case of enabling or disabling frequency hopping.

In some embodiments of this application, the control information indicates the repetition quantity, and the repetition quantity is a repetition quantity of the control information or a repetition quantity of a data channel for transmitting a TB; and the processing module 1101 is configured to: when the repetition quantity belongs to a first repetition quantity set, determine that the RV indication information indicates the first RV in S RV fields and/or S RV values, and when the repetition quantity belongs to a second repetition quantity set, determine that the control information indicates the first RV in T RV fields and/or T RV values, where T is less than S, a quantity of repetition quantities included in the second repetition quantity set is greater than a quantity of repetition quantities included in the first repetition quantity set, and T and S each are a positive integer; or when the repetition quantity belongs to a first repetition quantity set, determine that the control information indicates the first RV in S RV fields and/or S RV values, and when the repetition quantity belongs to a second repetition quantity set, determine that the first RV is a specific RV.

In some embodiments of this application, the processing module 1101 is configured to change, at intervals of time units whose quantity is a second parameter and based on the first RV corresponding to the first TB and the predetermined RV updating sequence, the RV used for the first TB in the time unit other than the k time units in the time resource used for transmission of the first TB.

It can be learned from the example description in the foregoing embodiments that, in this embodiment of this application, the quantity of bits occupied by the RV indication information included in the control information sent by the second communications device is less than 2M bits, and the second communications device may determine the first RV and the first parameter. In this embodiment of this application, an RV corresponding to a TB may be flexibly indicated based on the first parameter. All RVs corresponding to TBs do not need to be indicated by the RV indication information, to reduce overheads of the control information. When decoding performance is ensured and the overheads of the control information are proper, the control information indicates an RV used for transmission of one or more TBs.

It should be noted that content such as information exchange between the modules/units of the apparatus and the execution processes thereof is based on the same idea as the method embodiments of this application, and produces the same technical effects as the method embodiments of this application. For the specific content, refer to the foregoing description in the method embodiments of this application, and the details are not described herein again.

The embodiments of this application further provide a computer storage medium. The computer storage medium stores a program, and the program performs some or all of the steps described in the foregoing method embodiments.

Figure 12:
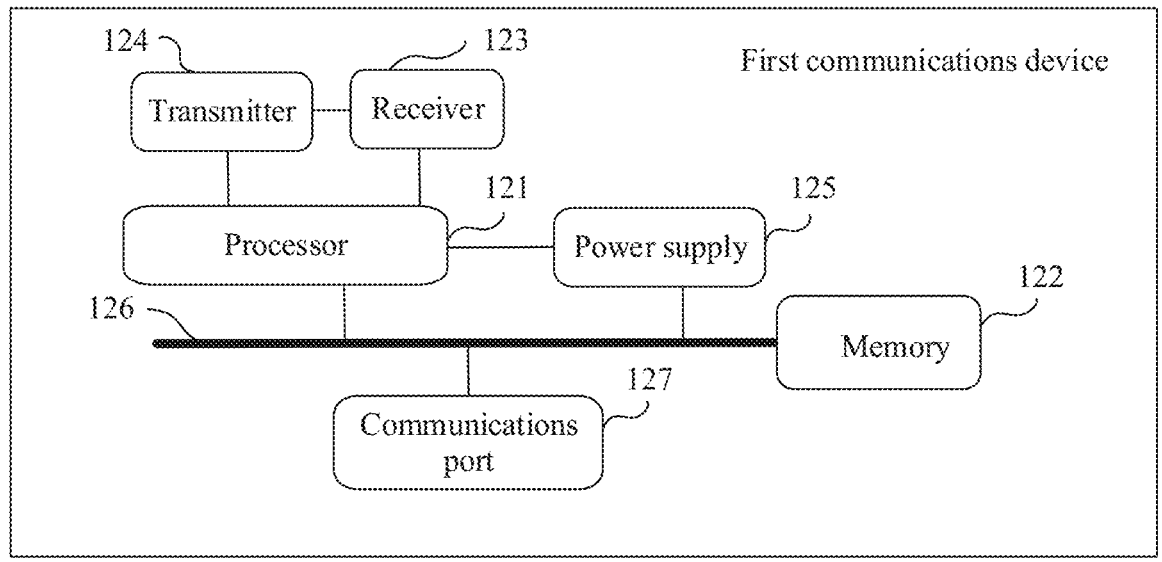
FIG. 12 is a schematic diagram of a structure of composition of a first communications device according to an embodiment of this application.

FIG. 12 is a schematic diagram of a structure of still another device according to an embodiment of this application. The device is a first communications device, and the first communications device may include a processor 121 (for example, a CPU), a memory 122, transmitter 124, and a receiver 123. The transmitter 124 and the receiver 123 are coupled to the processor 121, and the processor 121 controls a sending action of the transmitter 124 and a receiving action of the receiver 123. The memory 122 may include a high-speed RAM memory, or may include a nonvolatile memory (NVM), for example, at least one magnetic disk memory. The memory 122 may store various instructions, to complete various processing functions and implement steps of the method in the embodiments of this application. Optionally, the first communications device in this embodiment of this application may further include one or more of a power supply 125, a communications bus 126, and a communications port 127. The receiver 123 and the transmitter 124 may be integrated into a transceiver of the first communications device, or may be a receive antenna and a transmit antenna of the first communications device that are independent of each other. The communications bus 126 is configured to implement a communicative connection between components. The communications port 127 is configured to implement a communicative connection between the first communications device and another peripheral.

In this embodiment of this application, the memory 122 is configured to store computer-executable program code, and the program code includes instructions. When the processor 121 executes the instructions, the instructions enable the processor 121 to perform a processing action of the first communications device in the foregoing method embodiments, and enable the transmitter 124 to perform a sending action of the first communications device in the foregoing method embodiments. Implementation principles and technical effects thereof are similar, and details are not described herein again.

Figure 13:
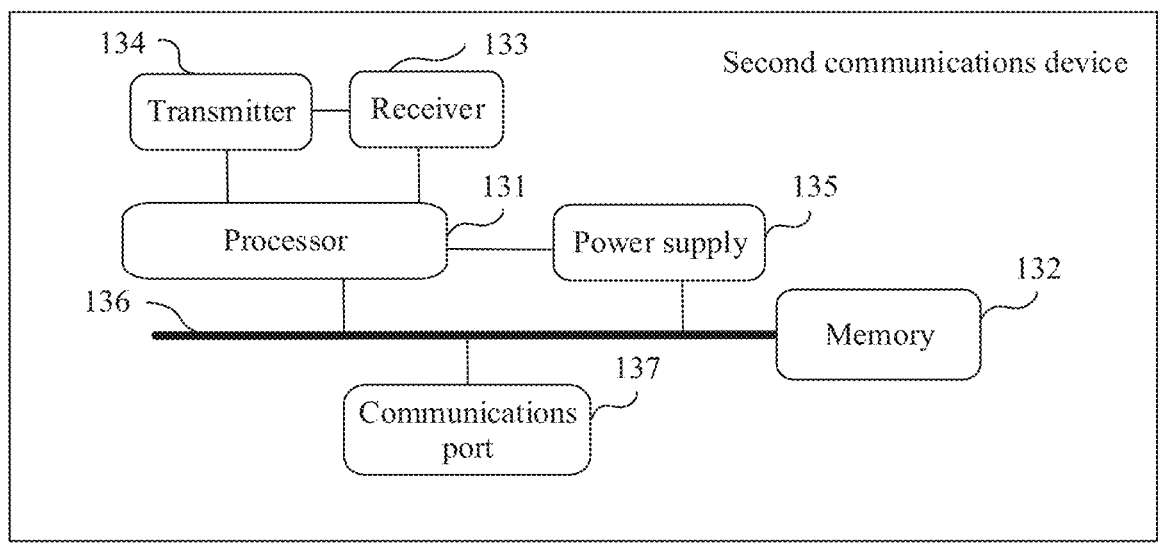
FIG. 13 is a schematic diagram of a structure of composition of a second communications device according to an embodiment of this application.

FIG. 13 is a schematic diagram of a structure of still another device according to an embodiment of this application. The device is a second communications device, and the second communications device may include a processor (for example, a CPU) 131, a memory 132, a receiver 133, and a transmitter 134. The receiver 133 and the transmitter 134 are coupled to the processor 131, and the processor 131 controls a receiving action of the receiver 133 and a sending action of the transmitter 134. The memory 132 may include a high-speed RAM memory, or may include a nonvolatile memory (NVM), for example, at least one magnetic disk memory. The memory 132 may store various instructions, to complete various processing functions and implement steps of the method in the embodiments of this application. Optionally, the second communications device in this embodiment of this application may further include one or more of a power supply 135, a communications bus 136, and a communications port 137. The receiver 133 and the transmitter 134 may be integrated into a transceiver of the second communications device, or may be a receive antenna and a transmit antenna of the second communications device that are independent of each other. The communications bus 136 is configured to implement a communicative connection between components. The communications port 137 is configured to implement a communicative connection between the second communications device and another peripheral.

In another possible design, when the communications device is a terminal device or a chip in a terminal device, the chip includes a processing unit and a communications unit. The processing unit may be, for example, a processor, and the communications unit may be, for example, an input/output interface, a pin, or a circuit. The processing unit may execute computer execution instructions stored in a storage unit, so that a chip in the terminal performs the wireless communications method according to any item of the first aspect. Optionally, the storage unit is a storage unit in the chip, for example, a register or a cache. The storage unit may alternatively be a storage unit that is in the terminal and that is located outside the chip, for example, a read-only memory (read-only memory, ROM) or another type of static storage device that can store static information and instructions, or a random access memory (random access memory, RAM).

The processor may be a general-purpose central processing unit (CPU), a microprocessor, an application-specific integrated circuit (application-specific integrated circuit, ASIC), or one or more integrated circuits configured to control program execution of the wireless communications method in the first aspect.

In addition, it should be noted that the described apparatus embodiment is merely an example. The units described as separate parts may or may not be physically separate, and parts displayed as units may or may not be physical units, may be located in one position, or may be distributed on a plurality of network units. Some or all the modules may be selected based on actual needs to achieve the objectives of the solutions of the embodiments. In addition, in the accompanying drawings of the apparatus embodiments provided by this application, connection relationships between modules indicate that the modules have communications connections with each other, which may be specifically implemented as one or more communications buses or signal cables. A person of ordinary skill in the art may understand and implement the embodiments of the present invention without creative efforts.

Based on the description of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any function that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for this application, software program implementation is a better implementation in most cases. Based on such an understanding, the technical solutions of this application essentially or the part contributing to the prior art may be implemented in a form of a software product. The software product is stored in a readable storage medium, such as a floppy disk, a USB flash drive, a removable hard disk, a read-only memory (ROM, Read-Only Memory), a random access memory (RAM, Random Access Memory), a magnetic disk, or an optical disc of a computer, and includes several instructions for instructing a computer device (which may be a personal computer, a server, a network device, and the like) to perform the methods described in the embodiments of this application.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on the computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Drive, SSD)), or the like.

What is claimed is:

1. A communications device, wherein the communications device is a first communications device, and the first communications device comprises:
   at least one processor; and
   one or more non-transitory memories coupled to the at least one processor and storing programming instructions for execution by the at least one processor to:

receive control information sent by a second communications device, wherein the control information is used to schedule a plurality of transport blocks (TBs), the control information comprises redundancy version (RV) indication information, a quantity of bits occupied by the RV indication information is less than 2M bits, and M is a maximum quantity of TBs that can be scheduled based on the control information;

determine a first parameter, wherein determining the first parameter comprises:

determining the first parameter through pre-specifying, determining the first parameter by receiving, physical layer signaling sent by the second communications device, or determining the first parameter by receiving higher layer signaling sent by the second communications device, wherein the first parameter is a parameter related to a first RV corresponding to a first TB, the first TB is one of the plurality of TBs scheduled based on the control information, the first RV is an RV used in starting k time units in a time resource used for transmission of the first TB, and k is a positive integer;

determine the first RV based on the first parameter; and determine, for the first TB based on the first RV and a predetermined RV updating sequence, an RV used in a time unit other than the k time units in the time resource used for transmission of the first TB.

2. The communications device according to claim 1, wherein the one or more non-transitory memories store the programming instructions for execution by the at least one processor to:

perform a modulo operation on the first parameter based on a hybrid automatic repeat request (HARQ) process number corresponding to the first TB, and use, as the first RV, a result obtained by performing the modulo operation; or perform a modulo operation on the first parameter based on a transport block index corresponding to the first TB, and use, as the first RV, a result obtained by performing the modulo operation.

3. The communications device according to claim 1, wherein the one or more non-transitory memories store the programming instructions for execution by the at least one processor to:

determine that the first parameter indicates that the RV indication information comprises N RV fields, wherein each RV field indicates one RV, and N is a positive integer; and determine that an RV indicated by the $(i+1)^{th}$ RV field in the RV indication information is the first RV, wherein:

i is a result obtained by performing a modulo operation on the first parameter based on a HARQ process number corresponding to the first TB, or i is a result obtained by performing a modulo operation on the first parameter based on a transport block index corresponding to the first TB.

4. The communications device according to claim 1, wherein the one or more non-transitory memories store the programming instructions for execution by the at least one processor to perform at least one of the following:

determine bundling that is to be performed on a response feedback of the first TB and a response feedback of a second TB in the plurality of TBs and that is indicated by the first parameter, wherein the first TB and the second TB have a same RV, and determine, based on an RV field comprised in the RV indication information, the first RV corresponding to the first TB;

determine a newly to-be-transmitted TB that is scheduled based on the control information and that is indicated by the first parameter, wherein newly to-be-transmitted TBs have a same RV, and determine, based on an RV field comprised in the RV indication information, the first RV corresponding to the first TB when the first TB is the newly to-be-transmitted TB; or determine a to-be-retransmitted TB that is scheduled based on the control information and that is indicated by the first parameter, wherein to-be-retransmitted TBs have a same RV, and determine, based on an RV field comprised in the RV indication information, the first RV corresponding to the first TB when the first TB is the to-be-retransmitted TB.

5. The communications device according to claim 1, wherein the one or more non-transitory memories store the programming instructions for execution by the at least one processor to:

determine an RV set indicated by the first parameter, and determine that an RV that is in the RV set and that is indicated by an RV field comprised in the RV indication information is the first RV; or determine an RV offset value indicated by the first parameter, and perform offset based on the RV offset value and an RV indicated by an RV field comprised in the RV indication information, wherein a result obtained after offset is the first RV.

6. The communications device according to claim 1, wherein the one or more non-transitory memories store the programming instructions for execution by the at least one processor to:

determine a quantity of RV fields or a quantity of RV values that corresponds to a repetition quantity and that is indicated by the first parameter; and determine a bit state of a first field that is comprised in the control information, and determine the first RV according to a one-to-one correspondence between a bit state of the first field and three parameters, wherein the three parameters comprise the repetition quantity, whether to enable frequency hopping, and the first RV; or determine a bit state of a first field that is comprised in the control information, and determine the first RV according to a one-to-one correspondence between a bit state of the first field and four parameters, wherein the four parameters comprise a quantity of TBs scheduled based on the control information, the repetition quantity, whether to enable frequency hopping, and the first RV.

7. The communications device according to claim 6, wherein:

the control information indicates the repetition quantity, and the repetition quantity is a repetition quantity of the control information or a repetition quantity of a data channel for transmitting a TB; and the one or more non-transitory memories store the programming instructions for execution by the at least one processor to:

when the repetition quantity belongs to a first repetition quantity set, determine, based on received higher layer signaling sent by the second communications device, to enable or disable frequency hopping, and when the repetition quantity belongs to a second repetition quantity set, determine, based on the control information, to enable or disable frequency hopping; or when the repetition quantity belongs to a first repetition quantity set, determine not to enable frequency hopping, and when the repetition quantity belongs to a second repetition quantity set, determine, based on the control information, to enable or disable frequency hopping.

8. The communications device according to claim 6, wherein:

the control information indicates the repetition quantity, and the repetition quantity is a repetition quantity of the control information or a repetition quantity of a data channel for transmitting a TB; and the one or more non-transitory memories store the programming instructions for execution by the at least one processor to:

when the repetition quantity belongs to a first repetition quantity set, determine that the RV indication information indicates the first RV in S RV fields or S RV values, and when the repetition quantity belongs to a second repetition quantity set, determine that the control information indicates the first RV in T RV fields or S RV values, wherein T is less than S, a quantity of repetition quantities comprised in the second repetition quantity set is greater than a quantity of repetition quantities comprised in the first repetition quantity set, and T and S each are a positive integer; or when the repetition quantity belongs to a first repetition quantity set, determine that the control information indicates the first RV in S RV fields or S RV values, and when the repetition quantity belongs to a second repetition quantity set, determine that the first RV is a specific RV.

9. The communications device according to claim 1, wherein the one or more non-transitory memories store the programming instructions for execution by the at least one processor to:

change, at intervals of time units whose quantity is a second parameter and based on the first RV corresponding to the first TB and the predetermined RV updating sequence, the RV used for the first TB in the time unit other than the k time units in the time resource used for transmission of the first TB.

10. A communications device, wherein the communications device is a second communications device, and the second communications device comprises:

at least one processor; and one or more non-transitory memories coupled to the at least one processor and storing programming instructions for execution by the at least one processor to:

send control information to a first communications device, wherein the control information is used to schedule a plurality of transport blocks (TBs), the control information comprises redundancy version (RV) indication information, a quantity of bits occupied by the RV indication information is less than 2M bits, and M is a maximum quantity of TBs that can be scheduled based on the control information;

determine a first RV of a first TB and a first parameter, wherein the first TB is one of the plurality of TBs scheduled based on the control information, the first RV is an RV used in starting k time units in a time resource used for transmission of the first TB, k is a positive integer, and the first parameter is a parameter related to the first RV;

send physical layer signaling to the first communications device, or send higher layer signaling to the first communications device, wherein the physical layer signaling or the higher layer signaling carries the first parameter; and determine, for the first TB based on the first RV and a predetermined RV updating sequence, an RV used in a time unit other than the k time units in the time resource used for transmission of the first TB.

11. The communications device according to claim 10, wherein the one or more non-transitory memories store the programming instructions for execution by the at least one processor to:

determine the first parameter and a hybrid automatic repeat request (HARQ) process number corresponding to the first TB, and determine the first RV based on an association relationship between the HARQ process number corresponding to the first TB and the first parameter; or determine the first parameter and a transport block index corresponding to the first TB, and determine the first RV based on an association relationship between the transport block index corresponding to the first TB and the first parameter.

12. The communications device according to claim 10, wherein the one or more non-transitory memories store the programming instructions for execution by the at least one processor to:

determine that an RV indicated by the $(i+1)^{th}$ RV field in the RV indication information is the first RV, wherein:

i is a result obtained by performing a modulo operation on the first parameter based on a HARQ process number corresponding to the first TB, or i is a result obtained by performing a modulo operation on the first parameter based on a transport block index corresponding to the first TB; and configure that the first parameter indicates that the RV indication information comprises N RV fields, wherein each RV field indicates one RV, and N is a positive integer.

13. The communications device according to claim 10, wherein the one or more non-transitory memories store the programming instructions for execution by the at least one processor to perform at least one of the following:

configure that the first parameter indicates to bundle a response feedback of the first TB and a response feedback of a second TB in the plurality of TBs, wherein the first TB and the second TB have a same RV, and an RV field comprised in the RV indication information in the control information indicates the first RV corresponding to the first TB;

determine the first RV corresponding to the first TB when the first TB is a newly to-be-transmitted TB, configure that the first parameter indicates newly to-be-transmitted TBs scheduled based on the control information, wherein the newly to-be-transmitted TBs have a same RV, and use an RV field comprised in the RV indication information to indicate the first RV; or determine the first RV corresponding to the first TB when the first TB is a to-be-retransmitted TB, configure a to-be-retransmitted TB that is scheduled based on the control information and that is indicated by the first parameter, wherein to-be-retransmitted TBs have a same RV, and use an RV field comprised in the RV indication information to indicate the first RV.

14. The communications device according to claim 10, wherein the one or more non-transitory memories store the programming instructions for execution by the at least one processor to:
determine that an RV that is in an RV set and that is indicated by an RV field comprised in the RV indication information is the first RV, and configure an RV set indicated by the first parameter; or
determine an RV indicated by an RV field comprised in the RV indication information, determine the first RV that corresponds to the first TB and that is configured for the first communications device, determine an RV offset value used when offset is performed based on the RV indicated by the RV field comprised in the RV indication information, to obtain the first RV, and set the RV offset value indicated by the first parameter.

15. The communications device according to claim 10, wherein the one or more non-transitory memories store the programming instructions for execution by the at least one processor to:
configure a quantity of RV fields or a quantity of RV values that corresponds to a repetition quantity and that is indicated by the first parameter; and
determine the first RV that corresponds to the first TB and that is configured for the first communications device, determine a bit state of a first field according to a one-to-one correspondence between a bit state of the first field and three parameters, and configure the bit state of the first field that is comprised in the control information, wherein the three parameters comprise the repetition quantity, whether to enable frequency hopping, and the first RV; or
determine the first RV that corresponds to the first TB and that is configured for the first communications device, determine a bit state of a first field according to a one-to-one correspondence between a bit state of the first field and four parameters, and configure the bit state of a first field that is comprised in the control information, wherein the four parameters comprise a quantity of TBs scheduled based on the control information, the repetition quantity, whether to enable frequency hopping, and the first RV.

16. The communications device according to claim 15, wherein:
the control information indicates the repetition quantity, and the repetition quantity is a repetition quantity of the control information or a repetition quantity of a data channel for transmitting a TB; and
the one or more non-transitory memories store the programming instructions for execution by the at least one processor to:
when the repetition quantity belongs to a first repetition quantity set, configure, based on a case of enabling or disabling frequency hopping, the higher layer signaling sent by the second communications device, and when the repetition quantity belongs to a second repetition quantity set, configure the control information based on the case of enabling or disabling frequency hopping; or
when the repetition quantity belongs to a first repetition quantity set, determine not to enable frequency hopping, and when the repetition quantity belongs to a second repetition quantity set, configure the control information based on the case of enabling or disabling frequency hopping.

17. The communications device according to claim 15, wherein;
the control information indicates the repetition quantity, and the repetition quantity is a repetition quantity of the control information or a repetition quantity of a data channel for transmitting a TB; and
the one or more non-transitory memories store the programming instructions for execution by the at least one processor to:
when the repetition quantity belongs to a first repetition quantity set, determine that the RV indication information indicates the first RV in S RV fields or S RV values, and when the repetition quantity belongs to a second repetition quantity set, determine that the control information indicates the first RV in T RV fields or S RV values, wherein T is less than S, a quantity of repetition quantities comprised in the second repetition quantity set is greater than a quantity of repetition quantities comprised in the first repetition quantity set, and T and S each are a positive integer; or
when the repetition quantity belongs to a first repetition quantity set, determine that the control information indicates the first RV in S RV fields or S RV values, and when the repetition quantity belongs to a second repetition quantity set, determine that the first RV is a specific RV.

18. The communications device according to claim 10, wherein the one or more non-transitory memories store the programming instructions for execution by the at least one processor to:
change, at intervals of time units whose quantity is a second parameter and based on the first RV corresponding to the first TB and the predetermined RV updating sequence, the RV used for the first TB in the time unit other than the k time units in the time resource used for transmission of the first TB.

19. An information transmission method, comprising:
receiving, by a first communications device, control information sent by a second communications device, wherein the control information schedules a plurality of transport blocks (TBs), the control information comprises redundancy version (RV) indication information, a quantity of bits occupied by the RV indication information is less than 2M bits, and M is a maximum quantity of TBs that can be scheduled by the control information;
determining, by the first communications device, a first parameter, wherein determining the first parameter comprises:
determining the first parameter through pre-specifying,
determining the first parameter by receiving physical layer signaling sent by the second communications device, or
determining the first parameter by receiving higher layer signaling sent by the second communications device,
wherein the first parameter is a parameter related to a first RV corresponding to a first TB, the first TB is one of the plurality of TBs scheduled by the control information, the first RV is an RV used in starting k time units in a time resource used for transmission of the first TB, and k is a positive integer;
determining, by the first communications device, the first RV based on the first parameter; and
determining, by the first communications device for the first TB based on the first RV and a predetermined RV updating sequence, an RV used in a time unit other than the k time units in the time resource used for transmission of the first TB.

20. An information transmission method, comprising:

sending, by a second communications device, control information to a first communications device, wherein the control information is used to schedule a plurality of transport blocks (TBs), the control information comprises redundancy version (RV) indication information, a quantity of bits occupied by the RV indication information is less than 2M bits, and M is a maximum quantity of TBs that can be scheduled based on the control information;

determining, by the second communications device, a first RV of a first TB and a first parameter, wherein the first TB is one of the plurality of TBs scheduled based on the control information, the first RV is an RV used in starting k time units in a time resource used for transmission of the first TB, k is a positive integer, and the first parameter is a parameter related to the first RV;

sending, by the second communications device, physical layer signaling to the first communications device, or sending higher layer signaling to the first communications device, wherein the physical layer signaling or the higher layer signaling carries the first parameter; and determining, by the second communications device for the first TB based on the first RV and a predetermined RV updating sequence, an RV used in a time unit other than the k time units in the time resource used for transmission of the first TB.

* * * * *

UNITED STATES PATENT AND TRADEMARK OFFICE
CERTIFICATE OF CORRECTION

PATENT NO. : 12,101,192 B2  
APPLICATION NO. : 17/513513  
DATED : September 24, 2024  
INVENTOR(S) : Zheng Yu and Wenping Bi Page 1 of 1

It is certified that error appears in the above-identified patent and that said Letters Patent is hereby corrected as shown below:

In the Claims

In Column 52, In Line 2, In Claim 17, delete "wherein;" and insert -- wherein: --.

Signed and Sealed this  
Seventeenth Day of December, 2024

Derrick Brent  
*Acting Director of the United States Patent and Trademark Office*